United States Patent
Danilak et al.

(10) Patent No.: US 9,507,529 B2
(45) Date of Patent: *Nov. 29, 2016

(54) APPARATUS AND METHOD FOR ROUTING INFORMATION IN A NON-VOLATILE MEMORY-BASED STORAGE DEVICE

(71) Applicant: Skyera, LLC, San Jose, CA (US)

(72) Inventors: Radoslav Danilak, Cupertino, CA (US); William Radke, Los Gatos, CA (US)

(73) Assignee: Skyera, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/961,184

(22) Filed: Dec. 7, 2015

(65) Prior Publication Data
US 2016/0110104 A1    Apr. 21, 2016

Related U.S. Application Data

(63) Continuation of application No. 14/078,302, filed on Nov. 12, 2013, now Pat. No. 9,229,855.

(51) Int. Cl.
*G06F 3/06* (2006.01)
*G06F 12/02* (2006.01)
*G06F 13/42* (2006.01)

(52) U.S. Cl.
CPC ............ *G06F 3/061* (2013.01); *G06F 3/0655* (2013.01); *G06F 3/0688* (2013.01); *G06F 12/0246* (2013.01); *G06F 13/4282* (2013.01); *G06F 2212/7201* (2013.01); *G06F 2212/7206* (2013.01); *G06F 2212/7209* (2013.01); *Y02B 60/1225* (2013.01)

(58) Field of Classification Search
CPC .... G06F 3/061; G06F 3/0655; G06F 3/0688; G06F 12/0246; G06F 12/02; G06F 13/4282

USPC ................ 711/103, 154, 158; 365/185.33
See application file for complete search history.

(56) References Cited

U.S. PATENT DOCUMENTS

| | | | |
|---|---|---|---|
| 9,003,104 B2 * | 4/2015 | Joshi ............... | G06F 12/0866 711/100 |
| 2010/0067278 A1 | 3/2010 | Oh et al. | |
| 2011/0307647 A1 | 12/2011 | Stalzer | |
| 2012/0102135 A1 | 4/2012 | Srinivasan et al. | |
| 2012/0239863 A1 | 9/2012 | Rao | |
| 2013/0139035 A1 | 5/2013 | Zhong et al. | |

OTHER PUBLICATIONS

International Search Report and Written Opinion for International Application No. PCT/US2014/065162 mailed Feb. 16, 2015 (14 pages).

* cited by examiner

*Primary Examiner* — Stephen Elmore
(74) *Attorney, Agent, or Firm* — Wilmer Cutler Pickering Hale and Dorr LLP

(57) ABSTRACT

Various systems, methods, apparatuses, and computer-readable media for accessing a storage device are described. In certain example embodiments, an active/active fault-tolerant storage device comprising two or more controllers may be implemented. In one aspect, each controller may have two or more processing entities for distributing the processing of the I/O requests. In one embodiment, the configuration of the components, modules and the controller board may be arranged in a manner to enhance heat dissipation, reduce power consumption, spread the power and work load, and reduce latency. In one embodiment, each controller may be coupled to the non-volatile memory (NVM) blades comprising the non-volatile memory (NVM) storage medium. In one example implementation, a standardized protocol, such as the Peripheral Component Interconnect Express protocol may be used for communicating amongst the various components of the controller and also the NVM storage medium.

20 Claims, 13 Drawing Sheets

FIG. 8

APPARATUS AND METHOD FOR ROUTING INFORMATION IN A NON-VOLATILE MEMORY-BASED STORAGE DEVICE

CROSS-REFERENCE TO RELATED APPLICATIONS

This patent application is a continuation of and claims the benefit under 35 U.S.C. §120 of U.S. application Ser. No. 14/078,302, filed Nov. 12, 2013, now U.S. Pat. No. 9,229,855, issued Jan. 5, 2016, entitled "APPARATUS AND METHOD FOR ROUTING INFORMATION IN A NON-VOLATILE MEMORY-BASED STORAGE DEVICE," the contents of which are incorporated herein by reference in their entirety.

BACKGROUND

Aspects of the disclosure relate to computing and communication technologies. In particular, aspects of the disclosure relate to systems, methods, apparatuses, and computer-readable media for improving performance of storage devices.

Storage devices for enterprise systems require massive storage capacity, low latency for reads and writes to the storage device, high bandwidth, low power consumption, and reliability. Traditionally, enterprise systems are implemented using media such as hard disk drives (HDD) that retain data while the power is turned off. Hard disk drives are data storage devices, used for storing and retrieving digital information, that use rapidly rotating disks. An HDD consists of one or more rigid ("hard") rapidly rotating disks (platters) with magnetic heads arranged on a moving actuator arm to read and write data to the disk surfaces. Due to moving parts, HDD are inherently prone to errors and failures, and have a floor on how low their access time and prices can fall.

Embodiments of the invention solve this and other problems.

BRIEF SUMMARY

Various systems, methods, apparatuses, and computer-readable media for accessing a storage medium are described. Techniques are described for optimally accessing storage medium. In one embodiment, the storage device may be implemented using non-volatile memory (NVM).

In certain example embodiments, an active/active fault-tolerant storage device comprising two or more controllers may be implemented. However, in other example embodiments, an active/standby system may also be implemented. In some embodiments, controllers may be implemented using an application-specific integrated circuit (ASIC), field programmable gate array (FPGA) or any other technology that integrates functionality of several discrete components onto a single die. In other embodiments, a controller may also encompass a controller board with multiple discrete components. In one aspect, each controller board may have two or more processors for distributing the processing of the Input/Output (I/O) requests. In one embodiment, the configuration of the components, modules and the controller board may be arranged in a manner to enhance heat dissipation, reduce power consumption, spread the power and work load, and reduce latency for servicing the I/O requests.

In one embodiment, each controller may be coupled to the non-volatile memory (NVM) blades comprising the NVM storage medium. Embodiments of the invention may also provide further enhancements to improve the access time to a NVM storage medium. Even though some embodiments of the invention may be described herein using a NVM storage medium for illustration purposes, in certain embodiments, the invention may not be limited to a NVM storage medium and other suitable physical storage mediums may be used without departing from the scope of the invention.

In one implementation, a standardized protocol, such as the Peripheral Component Interconnect Express (PCIe) protocol, may be used for communicating amongst the various components of the controller board and also the NVM storage medium.

An example storage device may include a first router from a plurality of routers coupled to a first blade from a plurality of blades, wherein the first blade may include a NVM storage medium, a first processor coupled to the first router wherein the first processor may be configured to receive a first input/output (I/O) request, determine that first data associated with the first I/O request is to be stored at a first location on the first blade coupled to the first router, and transmit the first data associated with the first I/O request to the first router for storing of the first data on the first blade. A second processor may be coupled to the first router wherein the second processor is configured to receive a second I/O request, determine that second data associated with the second I/O request is to be stored at a second location on the first blade coupled to the first router, and transmit the second data associated with the second I/O request to the first router for storing of the second data on the first blade.

In some embodiments, the storage device may further have the second processor configured to receive a third I/O request, determine that the third I/O request is a read request for the first data at the first location of the first blade coupled to the first router, request the first data from the first location from the first router, and receive the first data from the first router. In one implementation, the first processor and the second processor may be indirectly coupled to each other through the first router. In one embodiment, the controller board comprises the first router, the first processor and the second processor. In one implementation, the first processor may be coupled to a first memory and the second processor may be coupled to a second memory. In one aspect, the transmitting of data between the first processor and the first router and the transmitting of data between the second processor and the first router are performed using the Peripheral Component Interconnect Express (PCIe) protocol.

In certain implementations of the storage device, the storage device may further comprise a second router from the plurality of routers coupled to a second blade from the plurality of blades, wherein the second blade comprises NVM storage medium, the first processor coupled to the second router wherein the first processor may be configured to receive a third I/O request, determine that third data associated with the third I/O request is to be stored on the second blade at a third location, and transmit the third data associated with the third I/O request to the second router for storing of the data associated with the third I/O request on the second blade. The storage device may further have the second processor coupled to the second router wherein the second processor may be configured to receive a fourth I/O request, determine that fourth data associated with the fourth I/O request is to be stored on the second blade at a fourth location, and transmit the fourth data associated with the fourth I/O request to the second router for storing of the data associated with the fourth I/O request on the second blade.

In one embodiment, transmitting of data between the first processor and the second router and the transmitting of data between the second processor and the second router may be performed using the Peripheral Component Interconnect Express (PCIe) protocol. In one aspect, the first I/O request received by the first processor may be first received at one or more interfacing chips and forwarded to the first processor through one of the plurality of routers.

An example method for storing data may include receiving, at a first processor, a first I/O request, determining, at the first processor, that first data associated with the first I/O request is to be stored on a first blade at a first location coupled to a first router, wherein the first blade comprises a NVM storage medium, transmitting, by the first processor, the first data associated with the first I/O request to the first router for storing of the data on a first blade, receiving, at a second processor, a second I/O request, determining, at the second processor, that second data associated with the second I/O request is to be stored on the first blade at a second location coupled to the first router, and transmitting, by the second processor, the second data associated with the second I/O request to the first router for storing of the data on the first blade.

In some implementations, the example method may further include receiving, at the second processor, a third I/O request, determining, at the second processor, that the third I/O request is a read request for the first data from the first location of the first blade coupled to the first router, requesting the first data from the first location from the first router, and receiving the first data from the first router.

In one implementation, the first processor and the second processor are indirectly coupled to each other through a router. In one aspect, the controller board comprises the first router, the first processor and the second processor. The first processor may be coupled to a first memory and the second processor may be coupled to a second memory. In some implementations of the method, the transmitting of the first data between the first processor and the first router and the transmitting of the second data between the second processor and the first router may be performed using the Peripheral Component Interconnect Express (PCIe) protocol.

In certain embodiments of the method, the method may also include receiving, at the first processor, a third I/O request, determining, at the first processor, that third data associated with the third I/O request is to be stored on a second blade at a third location coupled to the second router, wherein the second blade comprises NVM storage medium, transmitting, by the first processor, the third data associated with the third I/O request to the second router for storing of the data associated with the third I/O request on the second blade, receiving, at the second processor, a fourth I/O request, determining, at the second processor, that fourth data associated with the fourth I/O request is to be stored on a second blade at a fourth location coupled to the second router, transmitting, by the second processor, the fourth data associated with the fourth I/O request to the second router for storing of the data associated with the fourth I/O request on the second blade. In some embodiments, the transmitting of the third data between the first processor and the second router and the transmitting of the fourth data between the second processor and the second router are performed using the Peripheral Component Interconnect Express (PCIe) protocol. The first blade may be one of a plurality of blades and the first router may be one of the plurality of routers. The first packet received by the first processor may be first received at one or more interfacing chips and forwarded to the first processor through one of the plurality of routers.

An example apparatus may include means for receiving the first I/O request, means for determining that the first data associated with the first I/O request is to be stored on a first blade at a first location coupled to a first router, wherein the first blade comprises NVM storage medium, means for transmitting the first data associated with the first I/O request to the first router for storing of the data on a first blade; means for receiving a second I/O request, means for determining that second data associated with the second I/O request is to be stored on a second blade at a second location coupled to a second router, and means for transmitting the second data associated with the second I/O request to the second router for storing of the second data on the second blade.

The foregoing has outlined rather broadly features and technical advantages of examples in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be features of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure can be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

FIG. 8 illustrates an example block diagram of the address space for the various components as visible by each component on the controller board, according to at least one embodiment of the invention.

DETAILED DESCRIPTION

Figure 1:
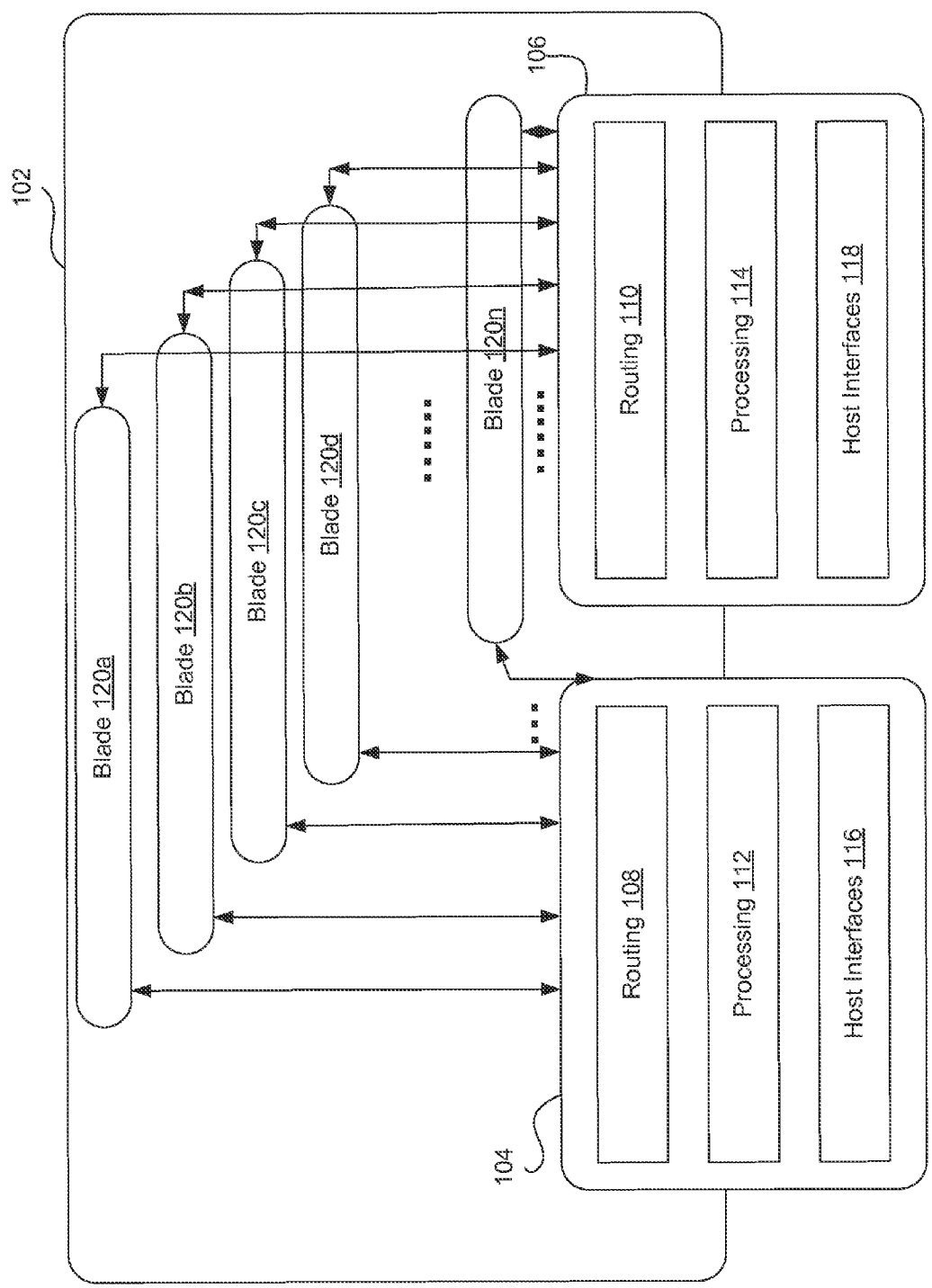
FIG. 1 illustrates an example high level block diagram of a storage device according to one embodiment of the invention.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Prior to discussing embodiments of the invention, description of some terms may be helpful in understanding embodiments of the invention.

In some embodiments, a "storage device," as discussed herein, may comprise a computer system configured to store and retrieve data from a storage medium. The computer system may be implemented using some or all components described with reference to FIG. 13. In some embodiments, the storage device may be used in an enterprise environment or other similar environment with a need for access of data through the network using low latency and high availability links to the storage device. Lower power consumption, lower cost and good heat dissipation may also be desirable from a storage device. In some embodiments, the storage device may be a rack mountable device, wherein multiple storage devices may be collocated and maintained collectively. In other embodiments, the storage device may be a stand-alone device. Although, the storage device may have other peripherals and devices similar to a conventional computer system, in some implementations, the storage device may be a stripped down server computer with a modular design optimized to minimize the use of physical space and energy. The storage device may also comprise a file system software stack stored on a storage medium in the storage device and executed by the processor to receive I/O requests, decode and translate those I/O requests to reads, writes and configuration commands to the underlying physical medium.

In some embodiments of the invention, a "flash storage medium," as discussed herein, may include non-volatile memory (NVM). In some instances, implementations of storage devices using NVM may also be referred to as solid-state devices. Example implementations of NVM based devices may include, but are not limited to, using NOR, NAND, MRAM (Magnetoresistive RAM), FRAM (Ferroelectric RAM, RRAM (Resistive RAM)), phase change memory or any other suitable technology. NOR flash may provide high-speed random access and reading and writing data in specific memory locations such as up to a single byte. NAND flash may read randomly but typically is written sequentially at high speed, handling data in small blocks called pages. NAND flash may read faster than it writes, quickly transferring whole pages of data. NOR flash may behave in the same way except that reads may be faster than NAND flash and writes may be slower. Generally, less expensive than NOR flash at high densities, NAND technology may offer higher capacity for the same-size silicon.

In some implementations, embodiments of the invention may utilize a single-level cell (SLC) NAND flash technology. In other implementations, embodiments of the invention may utilize a Multi-Level Cell (MLC) NAND flash storage medium. MLC NAND is a flash memory technology using multiple levels per cell to allow more bits to be stored using the same number of transistors. In SLC NAND flash technology, each cell can exist in one of two states, storing one bit of information per cell. Most MLC NAND flash memory technologies have four possible states per cell, so it can store two bits of information per cell. Using MLC NAND may be advantageous for reducing the cost of per unit of storage due to the higher data density.

As described herein, a "blade," "flash blade" or "NVM blade," in some embodiments, may refer to a grouping of one or more NVM chips together to provide storage, wherein the NVM chips comprise NVM storage medium. The NVM blade may have a blade controller for arbitrating access to the NVM storage medium. The NVM blade controller may be responsible for receiving commands for accessing/storing data on the NVM storage medium, processing the commands and storing or retrieving the data from the NVM storage medium. In one embodiment, the NVM blade controller may be implemented using an application-specific integrated circuit (ASIC). In another embodiment, the NVM blade controller may be implemented using a field-programmable gate array (FPGA).

Figure 7:
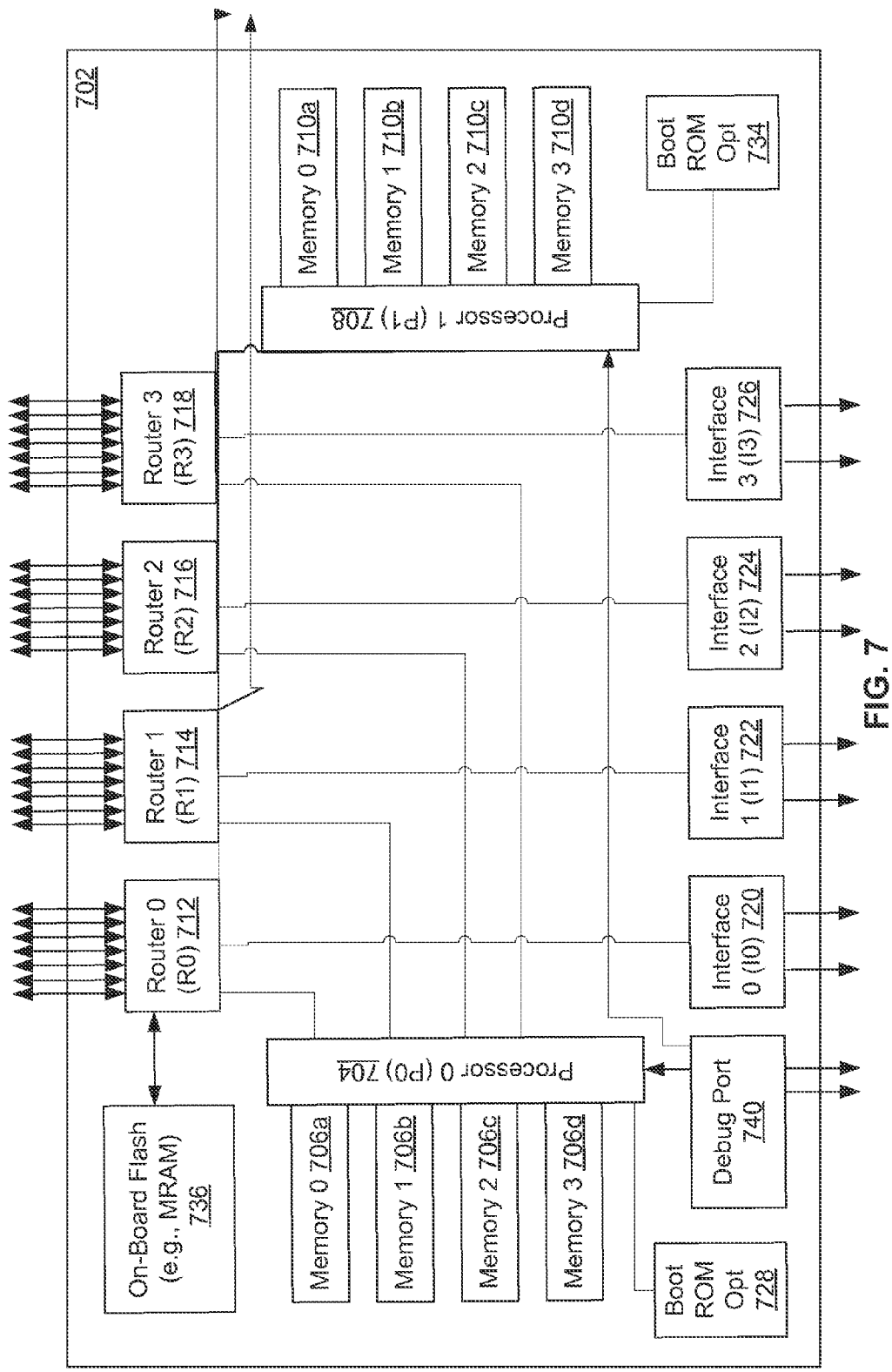
FIG. 7 illustrates an example block diagram of a controller board according to one embodiment of the invention.

As defined herein, a "controller board" may include various hardware, firmware and software components for receiving I/O requests and translating those I/O requests to commands for reading, writing or configuring the NVM storage medium. In one implementation, a controller board may be implemented using a printed circuit board (PCB), wherein the various components of the controller board may be coupled to the board and communicate with each other using buses. In other implementations, other means of communication, such as wireless, may be used for communicating between components. FIG. 7 is an exemplary embodiment of a controller board. Even though embodiments of the invention may be described in terms of several discrete components, in some embodiments, functionality of several discrete components may be performed by one silicon die. For example, functionality of multiple discrete components such as processing and routing, as described herein, may be performed by a controller implemented as an application-specific integrated circuit (ASIC), field programmable gate array (FPGA), multi-chip module (MCM) or any other silicon technology. As described herein, in one embodiment, even though a "controller board" may refer to several discrete components implementing a set of functions using a printed circuit board, a "controller" may refer to both a controller board (e.g., PCB board with discrete components) and a controller (e.g., functionality of several discrete components implemented as an ASIC, FPGA, etc.).

As described herein, a "processing entity" may refer to one or more physical or logical processors. The terms "processing entity" or "processing complex" may be used interchangeably throughout the specification, without deviating from the scope of the invention. For example, the processing entity may include a dual core, quad core or multi core processor from vendors such as Intel, Qualcomm, and Tilera. The processing entity may execute a file system software stack and decode I/O requests from the network for accessing the storage medium. In one implementation, the processing entity may include a root complex for the PCIe protocol or a similar protocol. In one implementation, the processing entity may be implemented as processing logic within an ASIC, FPGA or MCM.

As described herein, a "routing entity" may refer to one or more routers for routing data between the interfacing entities, the processing entities, the NVM blades and the routing entities themselves. In one implementation, the routing entity may represent a PCIe node or endpoint for the PCIe protocol.

As described herein, an "interfacing entity" may refer to one or more host interface chips for interfacing with the storage device. In one embodiment, the interfacing entity may forward the I/O requests to the routing entity using PCIe protocol. The I/O request at the interface chip may be received using any suitable protocol, such as Gigabit Ethernet, fiber channel, dial-in or even PCIe protocol.

As described herein, an "I/O request" may refer to an Input/Output request to the storage device from the network for storing or retrieving data from the storage medium.

As described herein, "Peripheral Component Interconnect Express (PCIe)" may refer to a high-speed serial computer expansion bus standard designed for higher maximum system bus throughput, lower I/O pin count and a smaller physical footprint, better performance-scaling for bus devices, a more detailed error detection and reporting mechanism and native hot-plug functionality. In a conventional PCIe system, the PCIe root complex enumerates all the endpoint devices coupled to the processor and creates a tree-like structure.

Storage devices for enterprise systems require massive storage capacity, low latency for reads and writes to the storage device, high bandwidth, low power consumption, and reliability. Traditionally, enterprise systems are implemented using storage medium such as hard disk drives (HDD) that retain data while the power is turned off. HDDs are data storage devices used for storing and retrieving digital information using rapidly rotating disks. An HDD consists of one or more rigid ("hard") rapidly rotating disks (platters) with magnetic heads arranged on a moving actuator arm to read and write data to the surfaces.

Due to moving parts involved in reading and writing data, HDDs are inherently prone to errors and failures, and have a floor on improvements of the seek time for data. Additionally, since HDDs have a spinning platter, there are also limitations on how small the parts can be manufactured and the power consumption of the parts.

In certain embodiments, techniques described herein propose implementing storage devices using NVM storage medium. It may be generally advantageous to use NVM storage medium in some embodiments, since NVM storage medium has lower seek times, does not have moving parts, and may be generally more reliable than HDDs.

In one embodiment, the configuration of the components, modules and the controller board may be arranged in a manner to enhance heat dissipation, reduce power consumption, spread the power and work load, and reduce latency.

Conventional storage devices may provide one or more controller boards with each controller board comprising a unitary processing complex to receive I/O requests, process the request and forward the storage request to the appropriate storage medium. With increasing network speeds and ever increasing demand for increase in size of the storage devices, a unitary point for accessing the physical medium for storage may become the bottleneck for the system resulting in high latency for I/O requests. Increasing the processing load at the unitary processing complex may result in higher heat concentrations in a smaller area making proper heat dissipation challenging. Moreover, a single processing unit may not be able to process transactions fast enough to keep up with the I/O requests. In conventional systems, the unitary system design may not have been as problematic, since the transaction bottleneck was more than often the seek times for reads and writes to the HDDs and not the processing path to the HDD.

In some embodiments, the storage device may be implemented using NVM storage medium. Generally, an NVM storage medium may have lower seek times than conventional HDDs. With the lower seek times afforded by the NVM storage medium, the conventional controller board designs using a single processing complex may result in a suboptimal configuration. Embodiments of the invention may also provide further enhancements to improve the access time to NVM storage medium. Even though some embodiments of the invention may be described herein using a NVM storage medium for illustration purposes, the invention may not be limited to a NVM storage medium and other suitable physical storage mediums may be used without departing from the scope of the invention.

Furthermore, conventional storage devices may implement fault-tolerant systems by maintaining mirrored storage for the data. In other words, for each write operation, the data may be stored in at least two separate storage sub-systems using independent processing paths. In the event of a catastrophic failure in the first storage sub-system, such as a power supply failure, failure of the storage medium or an error in the processing path, the second storage system with the mirrored data may be used as an active backup to retrieve and store data while the first system recovers. For HDDs, maintaining mirrored data may be essential due to the low reliability of the medium and feasible due to the lower costs associated with the medium.

In some embodiments, a NVM storage medium may be used for implementing a fault-tolerant system. Relatively, a NVM storage medium may be more reliable than conventional storage mediums and less prone to errors. In some implementations, the reliability of the data stored on the NVM storage medium may be assured using techniques such as redundant array of independent disks (RAID) or other suitable error recovery and correction techniques. Therefore, as described in further detail in the embodiments discussed herein with reference to the figures, it may be advantageous in embodiments implemented using a NVM storage medium to reduce the overall cost of the system by providing multiple paths for the same read or write operation to the same physical location of the NVM storage medium, instead of mirroring the entire system including the storage medium.

FIG. 1 illustrates an example high level block diagram of the storage device according to one embodiment of the invention. Block 102 illustrates a storage device with two controller boards (104 and 106) and an array of blades (120a-n) coupled to the controller boards. In one embodiment, the storage device from FIG. 1 may represent an active/active storage system. An active/active configuration enables the processing modules for both controller boards to process I/Os and provide a standby capability for the other. In one simplistic example, if a read or write command to a particular blade fails from controller board 104, the same read or write may be attempted through the controller board 106. A communication protocol may be implemented to communicate status information between the controller board 104 and 106. It may be advantageous to implement an active/active storage device to boost performance, since the processing modules associated with both controller boards may process I/O simultaneously or near simultaneously. However, the storage device from FIG. 1 is not limited to an active/active storage device and may also be used in an active/passive configuration, where the processing module for one controller board is active to process I/O requests, while the other is idle in standby mode ready to take over I/O activity should the active primary controller board fail or be taken offline.

As shown in FIG. 1, each NVM blade may be coupled to both the controller boards. Each controller board has a routing module (108 and 110) for routing, a processing module (112 and 114) for processing the I/O requests and a host interface (116 and 118) for receiving I/O requests. In one implementation, the routing module (108 and 110) may be responsible for routing the I/O requests from the interface modules (116 and 118) to the processing modules (112 and 114) for further processing of the I/O request. The processing modules (112 and 114) may process the I/O requests using a file system software stack (not shown). The routing module (108 and 110) also routes the access and store requests from the processing module (112 and 114) to the NVM blades 120*a*-*n*. In one implementation, the NVM blades are coupled to the routing modules (108 and 110) using PCIe protocol or any other suitable protocol.

In one implementation, each NVM blade may be coupled to both the controller boards (104 and 106) allowing each physical address of the NVM storage medium to be accessible by either of the controller boards. This configuration may be advantageous to avoid duplicating of the underlying storage medium and mirroring of the data, wherein the reliability of the data on the physical medium may be guaranteed by using more reliable storage medium and/or sophisticated data recovery techniques, such as RAID, or any combination thereof.

Figure 2:
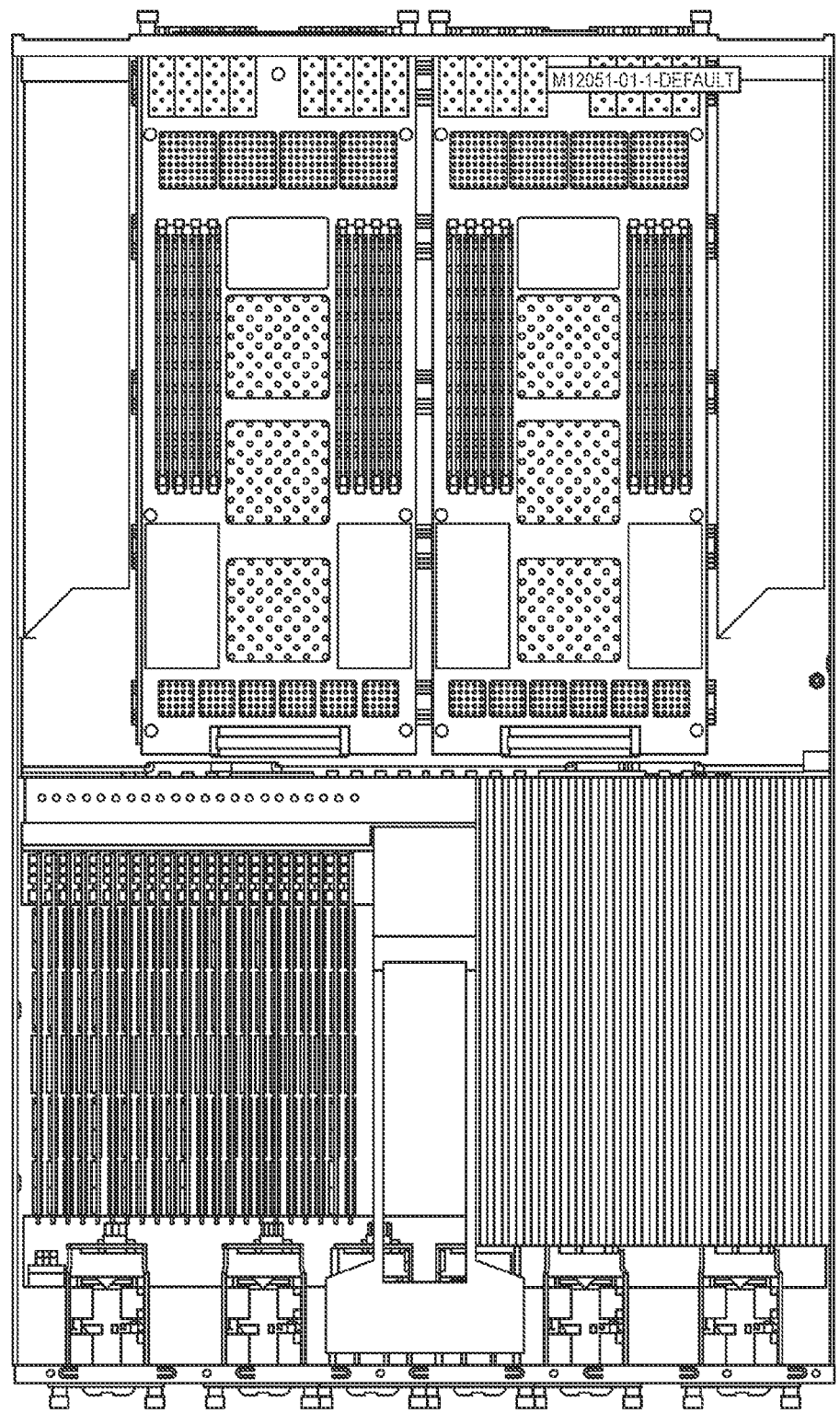
FIG. 2 illustrates another example block diagram of a storage device according to one embodiment of the invention.

FIG. 2 illustrates another exemplary block diagram of the storage device according to one embodiment of the invention. FIG. 2 shows an image of two controller boards, wherein each controller board includes two processors, memory, routers, and interface chips. FIG. 2 also depicts 42 NVM blades with a central channel for airflow. Although not shown, the storage device may also include two bridge boards with power management functionality and onboard NVM. The onboard NVM may be used for storing dynamic metadata, such as pointers, updated activity, cache backups and read/write buffers. In some embodiments, NVM such as Magnetic RAM that is byte writable may be used for implementing the onboard NVM. Additionally, the storage device may include 12 fans, wherein 8 fans are used for cooling the NVM memory and 4 fans are used for cooling the controller boards. The components may be placed in the example configuration of FIG. 2 to optimize airflow, processing load, heat dissipation. The storage device may also include multiple power supplies. Power supplies are generally failure prone and may fail due to failure of the fans or other power components. Having multiple power supplies powering the storage device may avoid failure of the storage device due to a failure of a component of one of the power supplies. In one implementation, the controllers or controller boards may be powered through a power rail, wherein the power rail may source power from the multiple power supplies. In the event of a failure of one of the power supplies connected to the power rail, the power rail continues to source power from the functioning power supply. In some implementations, the failed power supply may be hot-swappable (i.e., replaceable without power cycling the storage device) with a properly functioning power supply.

The NVM blades and controller/controller boards may have individually implemented digital circuit breakers for preventing a short circuit if any one of the boards fails. Furthermore, the power supplies may also be implemented in a manner to allow them to only source the power rail with power, but not drain power from the power rail in the event the power supply fails. In one implementation, diodes may be used to prevent the power from draining through a failed power supply.

The number of components described in reference to FIG. 2, such as the controller boards, power supplies, NVM blades, bridge boards and fans and their associated configuration are non-limiting and are provided as an example for illustrating a particular configuration of the storage device.

Figure 3:
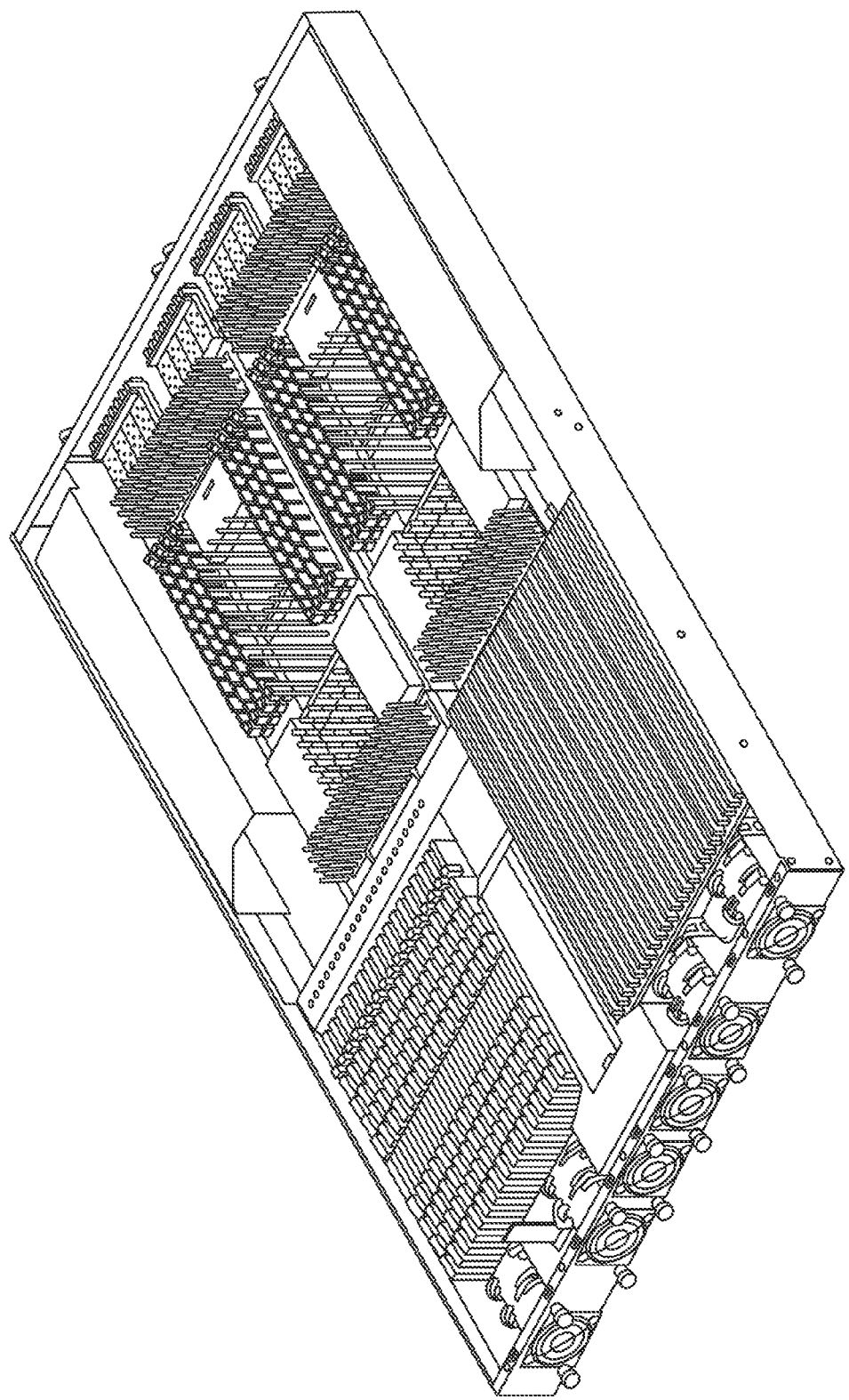
FIG. 3 illustrates yet another example block diagram of a storage device according to one embodiment of the invention.

FIG. 3 illustrates yet another example block diagram of the storage device according to one embodiment of the invention. As shown in FIG. 3, components of the storage device may be configured to fit into a rectangular shaped box. In one example configuration, the airflow may be from front to back, wherein the fans are placed at the back of the storage device. This shape may be advantageous in grouping multiple storage devices together in a rack configuration at an enterprise data storage facility. However, the shape of the storage device is not limited to the rectangular shaped box shown in FIG. 3.

Figure 4:
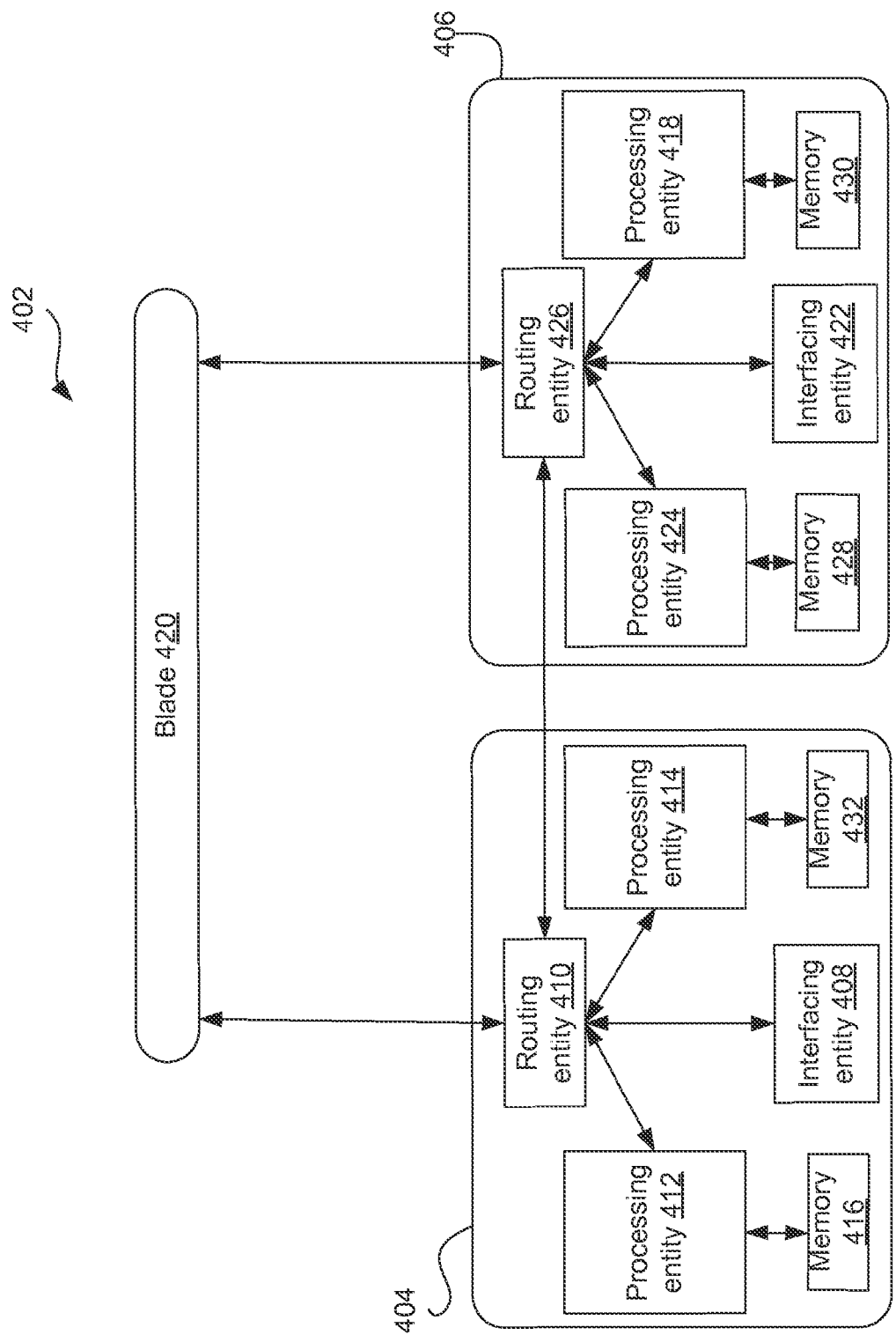
FIG. 4 illustrates an example block diagram of a storage device according to yet another embodiment of the invention.

FIG. 4 illustrates an example block diagram of the storage device according to one embodiment of the invention. System 402 of FIG. 4 illustrates a storage device with a first controller board 404 and a second controller board 406. For illustration purposes, FIG. 4 depicts a single NVM blade 420 from a plurality of NVM blades.

The first controller board 404 may have a first processing entity 412, a memory coupled to the first processing entity 416, a second processing entity 414, a memory coupled to the second processing entity 432, an interfacing entity 408, and a routing entity 410.

The second controller board 406 may have a third processing entity 424, a memory coupled to the third processing entity 428, a fourth processing entity 418, a memory coupled to the fourth processing entity 430, an interfacing entity 422, and a routing entity 426.

In one implementation, the routing entities (410 and 426) may be responsible for routing the I/O requests from the interfacing entities (408 and 422) to one of the processing entities (412, 416, 428 and 430) for further processing of the I/O request. The processing entities may process the I/O requests using a file system software stack (not shown). The routing entities (410 and 426) also route the data requests from the processing entities (412, 416, 428 and 430) to the NVM blade 420.

In some embodiments, the routing entity 410 from the first controller board 404 and the routing entity 426 from the second controller board 406 may be coupled to the NVM blade 420 for storing and retrieving data from the NVM blade 420. In one implementation, the NVM blade 420 is coupled to the routing entities using PCIe protocol. This configuration may be advantageous to avoid duplicating of the underlying storage medium and mirroring of the data, wherein the reliability of the data on the physical medium may be assured by using a more reliable storage medium and/or sophisticated data recovery techniques, such as RAID, or any combination thereof.

In FIG. 4, in one example configuration, the first processing entity 412 may be configured to receive one or more I/O requests, determine that the data associated with the I/O request is for a store operation and is associated with a specific location on the first blade coupled to the first routing entity 410, and transmit the data associated with the I/O request to the first routing entity for storing of the first data on the first blade 420. In one implementation, the file system software stack executing on the first processing entity 412 may determine the location and NVM blade operation associated with the I/O request. For example, in one embodiment, the first processing entity 412 may perform one or more address translations from the file identifier to the physical location for the data on the physical storage medium. In one aspect, the I/O request received by the first processing entity 412 may be first received at the interfacing entity 408 and forwarded to the first processing entity 412 through one of the plurality of routing entities.

Similarly, the second processing entity 414 may be configured to receive another I/O request, determine that the data associated with the I/O request is to be stored at another location on the first blade 420 coupled to the first routing entity 410 and transmit the data associated with the I/O request to the first routing entity 410 for storing of the data on the first blade 420. The second processing entity 414 may also execute a file system software stack for determining the location and storage operation associated with the I/O request.

The example above illustrates an example configuration and process for performing load balancing and spreading out the multiple I/O requests between the processing entities (412 and 414) for accessing the same NVM blade 420 between the two processing entities from the same controller board. Although two processing entities are shown, multiple processing entities may be used. This may be advantageous in spreading out the load of processing the I/O requests and also avoiding bottlenecks while performing multiple storage operations simultaneously to the same physical medium at very high speeds.

The stored data may also be retrieved from the physical medium using similar techniques. For example, the second processing entity 414 may be configured to receive an I/O request for reading the data stored by the first processing entity 412 or any other processing entity for that matter. The second processing entity 414 may determine that the I/O request is a read request for the data at a location of the first blade 420 coupled to the first routing entity 410, request the data from the location from the first routing entity 410, and receive the first data from the first routing entity 410.

In one example configuration, the first processing entity 412 and the second processing entity 414 may not be directly coupled, but coupled to each other through the first routing entity 410. The transmitting of data between the first processing entity 412 and the first routing entity 410 and the transmitting of data between the second processing entity 414 and the first routing entity 410 may be performed using PCIe protocol or any other suitable protocol.

For illustration purposes, even though FIG. 4 depicts one NVM blade and two controller boards, with each controller board having two processing entities, two memories and a routing entity and interfacing entity, embodiments of the invention are not limited to the number of entities depicted in the figure. For example, another example configuration may include multiple NVM blades, multiple routing entities and multiple interfacing entities, without departing from the scope of the invention. FIG. 7 is one example of such a configuration that has multiple routers (routing entities) and multiple interface chips (interfacing entities).

In another example configuration, the first processing entity 412 and the second processing entity 414 may be coupled to another (second) routing entity (not shown) on the first controller board 404. Similar to the routing entity 410, the second routing entity may also be coupled to another NVM blade and may process storage access commands received from both, the first processing entity 412 and the second processing entity 414. The transmitting of data between the first processing entity 412 and the second routing entity (not shown) and the transmitting of data between the second processing entity 414 and the second routing entity (not shown) may be performed using PCIe protocol or any other suitable protocol. Similarly, the components on the second controller board 406 may be configured and operate in a similar fashion to the first controller board 404 described above.

The NVM blade 420 may include multiple routing interfaces for communicating with the plurality of controller boards. In one example implementation of the storage device 402, the first controller board 404 comprising a routing entity 410 and the second controller board 406 comprising a routing entity 426 are coupled to the NVM blade 420. The NVM blade 420 may be coupled to the first controller board 404 through the routing entity 410 and the NVM blade may be coupled to the second controller board 406 through the routing entity 426. In one implementation, the NVM blade 420 communicates with the routing entities (410 and 426) on the controller boards using the PCIe protocol or any other suitable protocol. In one embodiment, the NVM blade comprises a NVM storage medium. In other embodiments, the storage device may include a plurality of NVM blades and the controller boards may include a plurality of routing entities.

In some embodiments, the routing entity 410 from the first controller board 404 and the routing entity 426 from the second controller board 406 may be coupled to each other. In some implementations, the two routing entities may be coupled to each other using a non-PCIe-compliant transparent bridge. In one implementation, the two routing entities (410 and 426) may communicate fault-tolerance information, system status information, completion of transaction information and other information regarding the state of the controller board with each other.

In one embodiment, the storage device 402 from FIG. 4 may represent an active/active storage system. An active/active configuration enables the processing modules for both controller boards to process I/O reads and provide a standby capability for the other. In one simplistic example, if a read or write command to a particular blade fails from controller board 404, the same read or write may be attempted through the controller board 406. As described above, a communication protocol may be implemented to communicate status information between the controller board 404 and 406 through the routing entities 410 and 426. It may be advantageous to implement an active/active storage device to boost performance, since the processing modules associated with both controller boards may process I/O simultaneously. However, the storage device from FIG. 4 is not limited to an active/active storage device and may also be used in an active/passive configuration, where the processing module for one controller board is active to process I/O requests, while the other is idle in standby mode ready to take over I/O activity should the active primary controller board fail or be taken offline.

In one implementation of an active/active system, one or more controller boards may assume the role as the master board and the other one or more boards may assume the role of being slave boards. The master controller board may perform all data writes to the NVM blades, whereas either of the master or slave boards may perform reads.

In one example implementation, I/O write operations arriving at the slave controller board may be partially performed by the master controller board. For example, the write command or the information associated with the write command may be forwarded from the slave controller board to the master controller board. In one implementation, the NT PCIe bridge may be used for passing the information associated with the write operation from the slave controller board to the master controller board. In one implementation, the data for the write operation arriving at the slave controller board may still be provided to the NVM blade by the slave controller board.

The master and the slave controller boards may maintain mapping tables for mapping the read and write operations to the NVM blades. In one implementation, the read and write tables are stored in one of the NVM blades. In one implementation, the read and write tables may be shared by the two controller boards. Yet, in another implementation, the read and write tables may be maintained separately by the controller boards. In instances where each controller board has its own table, the master controller board may update the tables for the master and slave controller boards.

If the slave controller board fails, the master controller board continues to process operations. On the other hand, if the master controller board fails, the storage device fails over to the slave controller board. The slave controller board may become the new master controller board and begin processing all I/O write operations.

The system described above may allow distributing out the workload for read transactions through-out the two or more controller boards, since the read operations need processing power and time for decoding the I/O requests.

Figure 5:
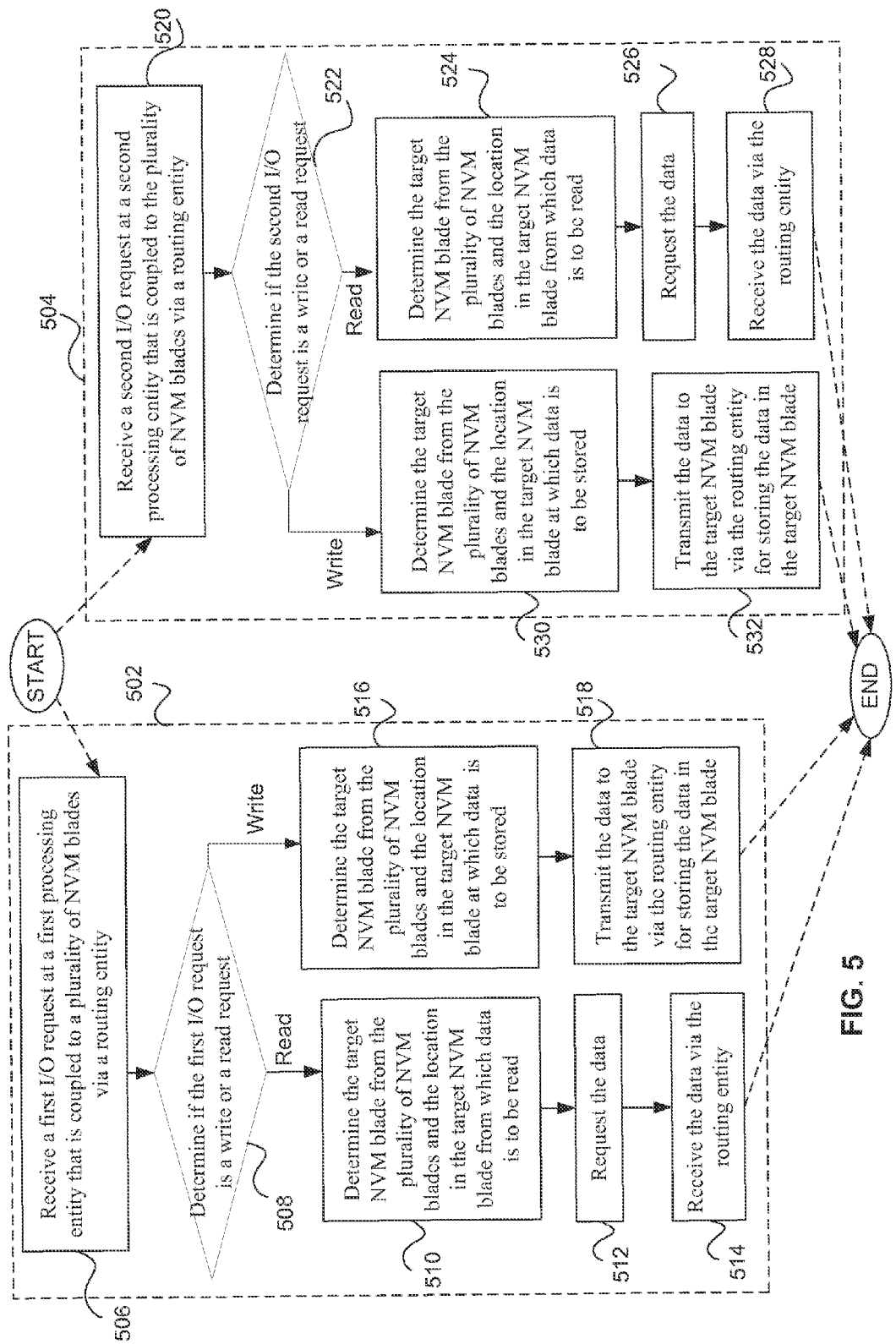
FIG. 5 is a flow diagram, illustrating a method for performing embodiments of the invention according to one embodiment of the invention.

FIG. 5 is a flow diagram, illustrating a method for performing embodiments of the invention according to one embodiment of the invention. The signaling in method 500 is performed by processing logic that comprises hardware (circuitry, dedicated logic, etc.), software (such as is run on a general purpose computing system or a dedicated machine), firmware (embedded software), or any combination thereof. In one embodiment, the method 500 is performed by one or more computer systems 1300 as described in FIG. 13.

The flow diagram of FIG. 5 depicts a first processing entity 502 and a second processing 504 processing I/O requests. Even though, FIG. 5 depicts only two processing entities, multiple processing entities may be implemented for performing embodiments of the invention as described with reference to FIG. 5. For example, the embodiments of the invention may perform similar steps of the invention performed by the first processing entity or the second processing entity, using a third, fourth, fifth, or any number of processing entities. Furthermore, even though, only one I/O request is depicted for each processing entity between the start and the end indicators in FIG. 6, any number of I/O request may be performed.

At step 506, the first processing entity coupled to a plurality of NVM blades receives a first I/O request via a routing entity.

At step 508, the first processing entity determines if the first I/O request is a write or a read request. At step 508, if the first I/O request is determined to be a read request, at step 510, the first processing entity may determine the target NVM blade from the plurality of NVM blades and the location in the target NVM blade from which data is to be read. In one implementation, the first processing entity may determine the target NVM blade and the location in the target NVM blade by performing one or more address translations using a file system software stack executing on the first processing entity.

At step 512, the first processing entity requests the data associated with the first I/O request. At step 514, the first processing entity receives the data via the routing entity for the read I/O request.

At step 508, if the first I/O request is determined to be a write request, at step 516, the first processing entity may determine the target NVM blade from the plurality of NVM blades and the location in the target NVM blade at which data is to be stored. In one implementation, the first processing entity may determine the target NVM blade and the location in the target NVM blade by performing one or more address translations using a file system software stack executing on the first processing entity. At step 518, the first processing entity transmits the data to the target NVM blade via the routing entity for storing the data in the target NVM blade for the write I/O request.

Similarly, at the second processing entity 504, at step 520, the second processing entity coupled to a plurality of NVM blades may receive a second I/O request via a routing entity. The second processing entity 504 may receive the second I/O request before/after or concurrently to the first I/O request received at the first processing entity. Furthermore, the first processing entity 502 and the second processing entity 504 may perform the steps identified in FIG. 5 independently of each other.

At step 522, the second processing entity determines if the second I/O request is a write or a read request. At step 522, if the second I/O request is determined to be a read request, at step 524, the second processing entity may determine the target NVM blade from the plurality of NVM blades and the location in the target NVM blade from which data is to be read. In one implementation, the second processing entity may determine the target NVM blade and the location in the target NVM blade by performing one or more address translations using a file system software stack executing on the second processing entity. At step 526, the second processing entity requests the data associated with the second I/O request. At step 528, the second processing entity receives the data via the routing entity for the read I/O request.

In the alternative, at step 522, if the second I/O request is determined to be a write request, at step 530, the second processing entity may determine the target NVM blade from the plurality of NVM blades and the location in the target NVM blade at which data is to be stored. In one implementation, the second processing entity may determine the target NVM blade and the location in the target NVM blade by performing one or more address translations using a file system software stack executing on the second processing entity. At step 532, the second processing entity transmits the data to the target NVM blade via the routing entity for storing the data in the target NVM blade for the write I/O request.

As discussed above, similar to the first processing entity 502, the second processing entity 504 may process I/O requests. In some embodiments, the first processing entity and the second processing entity may process I/O requests in any sequence with respect to each other and also process I/O requests simultaneously. Furthermore, the first processing entity and the second processing entity may simultaneously process transactions targeted to one of the plurality of NVM blades.

Referring back to FIG. 4, examples of two processing entities in a system may be illustrated by any of the processing entities depicted in FIG. 4. For example, the two processing entities may be 412 and 414 on the same controller board 404, or processing entity 412 and processing entity 428 residing on different controller boards.

The communication amongst one or more components discussed with reference to FIG. 5 may be performed using PCIe protocol or any other suitable protocol. The method of FIG. 5 may be advantageous in spreading the I/O requests amongst multiple processing entities, even if the I/O requests result in memory operations to the same NVM blade for enabling faster processing, avoiding bottlenecks and facilitating better heat dissipation.

It should be appreciated that the specific steps illustrated in FIG. 5 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 500.

Figure 6:
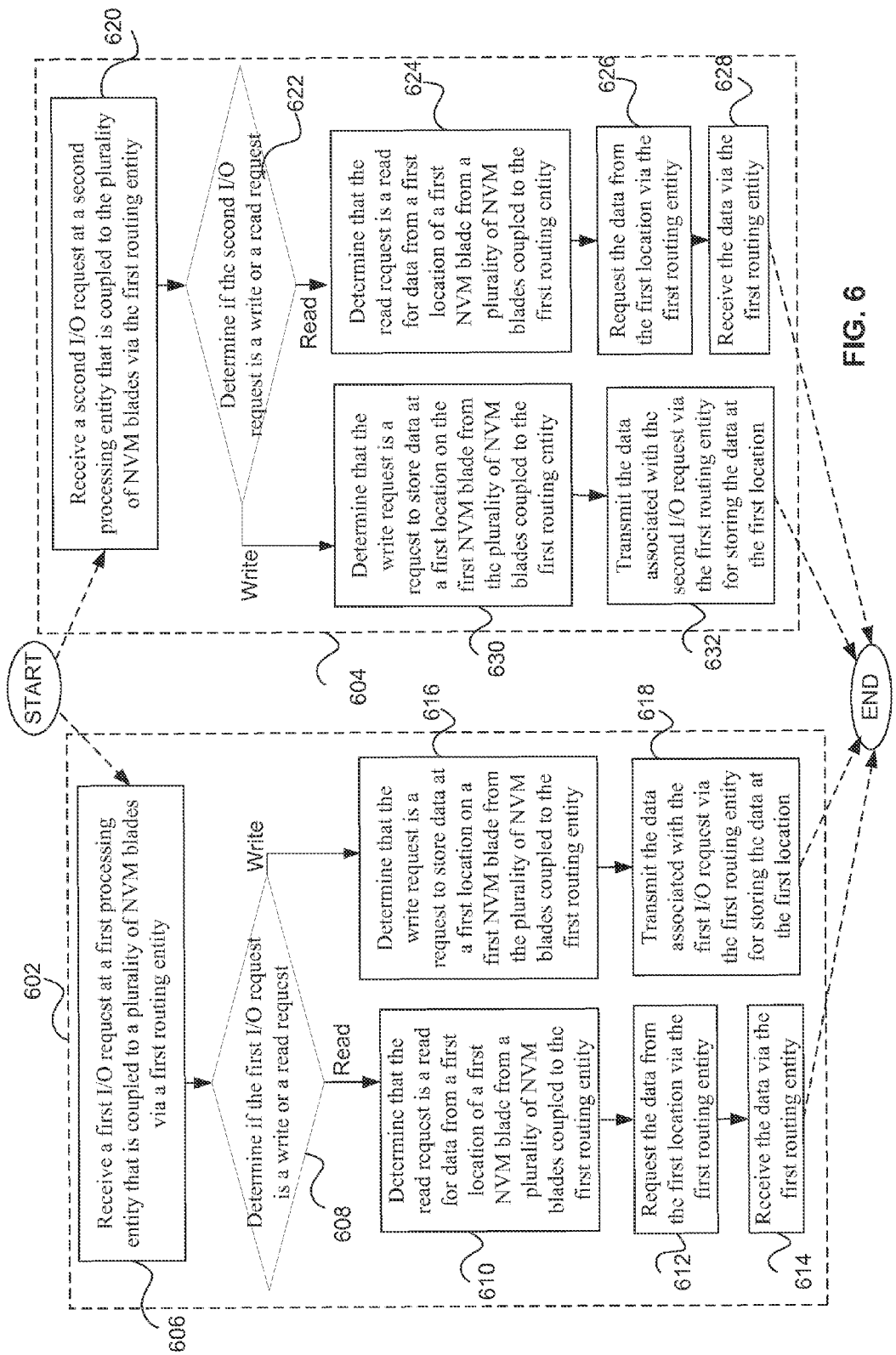
FIG. 6 is a flow diagram, illustrating another method for performing embodiments of the invention according to another embodiment of the invention.

FIG. 6 is a flow diagram, illustrating another method for performing embodiments of the invention according to one embodiment of the invention. The signaling in method 600 is performed by processing logic that comprises hardware (circuitry, dedicated logic, etc.), software (such as is run on a general purpose computing system or a dedicated machine), firmware (embedded software), or any combination thereof. In one embodiment, the method 600 is performed by one or more computer systems 1300 as described in FIG. 13.

The flow diagram of FIG. 6 depicts a first processing entity 602 and a second processing 604 processing I/O requests. Even though, FIG. 6 depicts only two processing entities, multiple processing entities may implemented for performing embodiments of the invention as described with reference to FIG. 6. For example, the embodiments of the invention may perform similar steps of the invention performed by the first processing entity or the second processing entity, using a third, fourth, fifth, or any number of processing entities. Furthermore, even though, only one I/O request is depicted for each processing entity between the start and the end indicators in FIG. 6, any number of I/O request may be performed. FIG. 6 describes one implementation of the embodiment described in FIG. 5.

At step 606, the first processing entity coupled to a plurality of NVM blades receives a first I/O request via a first routing entity.

At step 608, the first processing entity determines if the first I/O request is a write or a read request. At step 608, if the first I/O request is determined to be a read request, at step 610, the first processing entity may determine that the read request is a read for data from a first location of a first NVM blade from a plurality of NVM blades coupled to the first routing entity. In one implementation, the first processing entity may determine the first NVM blade and the first location on the first NVM blade by performing one or more address translations using a file system software stack executing on the first processing entity.

At step 612, the first processing entity requests the data associated with the first I/O request via the first routing entity. At step 614, the first processing entity receives the data via the first routing entity and completes the read I/O request.

At step 608, if the first I/O request is determined to be a write request, at step 616, the first processing entity may determine the first NVM blade from the plurality of NVM blades and the first location on the first NVM blade at which data is to be stored. In one implementation, the first processing entity may determine the first NVM blade and the first location on the first NVM blade by performing one or more address translations using a file system software stack executing on the first processing entity. At step 618, the first processing entity transmits the data to the first NVM blade via the first routing entity for storing the data at the first location on the first NVM blade.

Similarly, at the second processing entity 604, at step 620, the second processing entity coupled to a plurality of NVM blades may receive a second I/O request via a first routing entity. The second processing entity 604 may receive the second I/O request before/after or concurrently to the first I/O request received at the first processing entity.

At step 622, the second processing entity determines if the second I/O request is a write or a read request. At step 622, if the second I/O request is determined to be a read request, at step 624, the second processing entity may determine that the read request is a read for data from the first location of the first NVM blade from the plurality of NVM blades coupled to the first routing entity. In one implementation, the second processing entity may determine the first NVM blade and the first location on the first NVM blade by performing one or more address translations using a file system software stack executing on the second processing entity. At step 626, the second processing entity requests the data associated with the second I/O request via the first routing entity. At step 628, the second processing entity receives the data via the first routing entity and completes the read I/O request.

In the alternative, at step 622, if the second I/O request is determined to be a write request, at step 630, the second processing entity may determine the write request may be a request to store data at a first location on the first NVM blade from the plurality of NVM blades coupled to the first routing entity. In one implementation, the first processing entity may determine the first NVM blade and the first location on the first NVM blade by performing one or more address translations using a file system software stack executing on the second processing entity. At step 632, the second processing entity transmits the data to the target NVM blade via the first routing entity for storing the data in the target NVM for the write I/O request.

As discussed above, similar to the first processing entity 602, the second processing entity 604 may process I/O requests. In some embodiments, the first processing entity and the second processing entity may process I/O requests in any sequence with respect to each other and also process I/O requests simultaneously. Furthermore, the first processing entity and the second processing entity may simultaneously process transactions targeted to one of the plurality of NVM blades.

Referring back to FIG. 4, examples of two processing entities residing on the same controller board and accessing the same NVM blade through the same routing entity may be illustrated by processing entities 412 and 414 residing on the same controller board 404. The steps described in FIG. 6 allow two processing entities residing on the same controller board to simultaneously process and service I/O requests targeted to the same NVM blade or even the same location on the NVM blade. As described in FIG. 6, even though the I/O requests may be decoded and processed at separate processing entities, they may use the same routing entity to access the NVM blades, thus saving cost by avoiding duplication of hardware.

The communication amongst one or more components discussed with reference to FIG. 6 may be performed using PCIe protocol or any other suitable protocol. The method of FIG. 6 may be advantageous in spreading the I/O requests amongst multiple processing entities, even if the I/O requests result in memory operations to the same NVM blade for enabling faster processing, avoiding bottlenecks and facilitating better heat dissipation.

It should be appreciated that the specific steps illustrated in FIG. 6 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 600.

FIG. 7 illustrates an exemplary block diagram of a controller board according to one embodiment of the invention. In one embodiment, controller board 702 may represent controller board 104 or 106 of FIG. 1. As shown in FIG. 7, the controller board has 2 processors (704 and 708), 4 routers (712, 714, 716, 718) and 4 interface chips (720, 722, 724 and 726). Processor 0 (704) may have a memory controller for controlling access to its local memory 706a-d. Similarly, processor 1 (708) may also have a memory controller for controlling access to its local memory 710a-d. In one embodiment, the interface chips and the routers may communicate with each other using PCIe protocol or any other suitable protocol. PCIe may also be used as the routing protocol for communication between the processors and the routers. The I/O request at the interface chip may be received using any protocol, such as Gigabit Ethernet, fiber channel, dial-in or even PCIe protocol.

As shown in FIG. 7, in one embodiment, each interface chip can communicate data to either of the processors (704 and 708) through a router. Each interface chip may be coupled to at least one router through the PCIe protocol or any other suitable protocol. The I/O requests may arrive at one of the interface chips. The interface chip may forward the I/O requests to the router using PCIe protocol. Each router is connected to both the processors on the controller board 702. The router receives the I/O request and determines a processor to forward the I/O request to for further processing. Once the processor has decoded the I/O request and ascertained an operation for storing or retrieving data from the NVM storage medium, the processor sends a memory operation command to one of the routers. Each router is coupled to a subset of the NVM storage medium through NVM blades. For example, in FIG. 7, each router connects to approximately one-fourth of the total number of NVM blades. The determination of sending a NVM storage medium request to the router may be based on the address of the store/access request within the NVM storage address space. For example, if the processor 704 determines that the I/O request results in a store to a NVM blade coupled the router R2 (716), then the processor may forward the request to router R2 (716) using PCIe protocol. The router R2 (716) forwards the storage request to the respective NVM blade for storing.

In certain embodiments, the configuration described with respect to FIG. 7 may be advantageous in reducing the load associated with the various electrical components, increasing throughput of operations to NVM storage medium, and dissipating the heat from the various components within the storage device.

In a conventional PCIe system, a central processing unit may encompass the root complex for the entire system. The PCIe root complex enumerates all the endpoint devices coupled to the processor and creates a tree like structure. All requests originating at the end points are processed by the one or more processors coupled to the PCIe root complex. In a storage device with a large number of requests originating from the endpoints, such as the interface chips, the root complex and the processor become a bottleneck for the processing of transactions in the system. In one implementation, a more powerful processor may be used for processing the I/O requests quickly and relieving the bottleneck. Although this approach may temporarily relieve the bottleneck, it may increase the power load associated with the processor. Furthermore, the processor may also generate more heat across a small area on the controller board due to the increased number or I/O request processed by the processor. The increased heat at one processor or closely clustered processors may make it challenging to maintain a tighter heat envelope for the storage device, as a whole, at an acceptable level. Additional power load and heat may create more failures both, at a component level and a device level.

Embodiments of the invention propose spreading out the processing and routing functionality for accessing the NVM storage across the controller board to a plurality of processing entities. In one embodiment, multiple processing entities may be spread across the controller board for processing I/O requests. In one implementation, one of the processing entities may act as the PCIe root complex and the second processing entity may act as the end point. For example, in FIG. 7, the processor 0 (707) may be configured as the PCIe root complex and the processor 1 (708) may be configured as an end point. In one implementation, the memory space for processor 1 (708) may be enumerated as an end point four times for each of the routers (Router 0 (712), Router 2 (714), Router 3 (716) and Router 4 (718)). In instances where the receiving router for the I/O request does not have the appropriate mapping for an I/O request, the router may forward the I/O request to the processing entity configured as the PCIe root complex for determining the mapping. Also, the interface chips may be configured with routing information at time of configuration.

In instances where the routing is already established at the interface chip and the router, an I/O request arriving at the interface chip and forwarded to the router may be sent to either of the processing entities (704 and 708) spreading out the processing functionality. Besides processing, the described architecture may also spread out the connectivity of the links. For example, multiple interface chips may be implemented for simultaneously receiving I/O requests and forwarding those I/O request to the routers. Furthermore, the NVM blades are distributed amongst the routers, allowing the access to the NVM blades to be distributed amongst multiple routers, avoiding bus or routing backlogs. Such a configuration, as described in FIG. 7, may also be advantageous in allowing access to multiple blades at the same time, drastically improving read and write performance when accessing NVM blades accessible through different routers. In an alternate implementation, embodiments of the invention propose multiple processing entities, each having their own root complex for spreading out the processing and routing functionality for accessing the NVM storage across the controller board. Each endpoint (i.e., router) may be connected to more than one root complex. Therefore, an I/O request arriving at the interface chip and forwarded to the router can be sent to either of the processing entities (704 and 708) spreading out the processing functionality. Besides processing, the described architecture may also spread out the connectivity of the links. For example, multiple interface chips may be implemented for simultaneously receiving I/O requests and forwarding those I/O request to the routers. Furthermore, the NVM blades are distributed amongst the routers, allowing the access to the NVM blades to be distributed amongst multiple routers, avoiding bus or routing backlogs. Since each processor connects to every router on the controller board, each processor can individually address any NVM storage address. Such a configuration, as described in FIG. 7, may also be advantageous in allowing access to multiple blades at the same time, drastically improving read and write performances when accessing NVM blades accessible through different routers.

Processor 0 (704) may boot from Boot ROM 728 and processor 1 (708) may boot from Boot ROM 734. In one embodiment, the Boot ROM image that is executed on the processor 704 may also include initialization information for the storage file system stack. In one implementation, the storage file system operating system (OS) may be loaded from on-board NVM. In another implementation, the storage file system OS may be loaded from one of the NVM blades. In one implementation, the images for the OS executing on processor 0 (704) and processor 1 (708) may be different. The file system OS may be responsible for converting I/O requests to hardware reads and writes.

In certain embodiments, onboard NVM 736 may be used for storing dynamic metadata, such as pointers, updated activity, cache backups and read/write buffers. In some embodiments, NVM such as Magnetic RAM (MRAM), that is byte writable, may be used for implementing the onboard NVM. The controller board may also have a debug port 740 connected to the processor 704 and processor 708. The debug port may support one or more separate interfaces, such as USB, PCIe, Gibabit Ethernet, etc.

Figure 8:
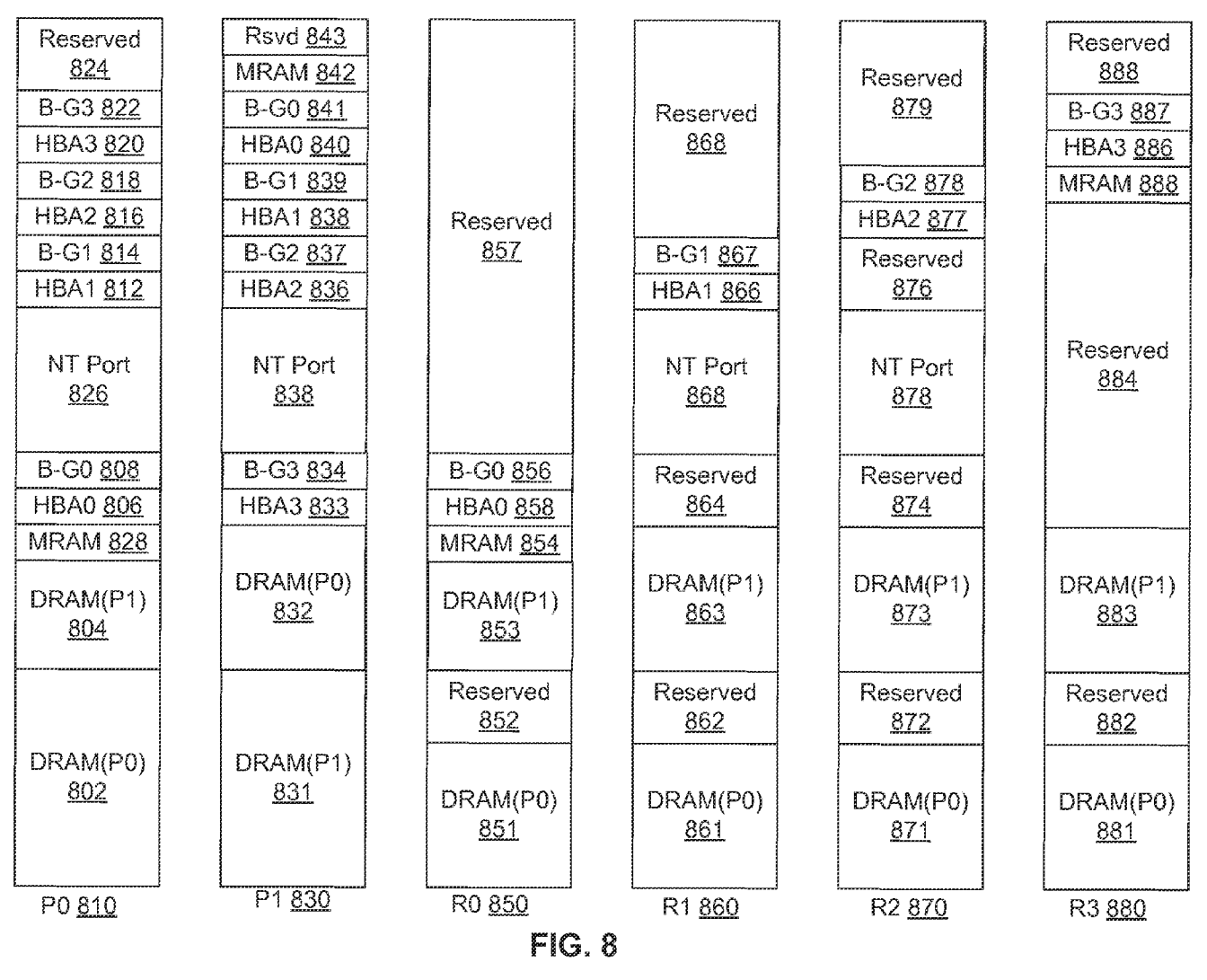

FIG. 8 illustrates an example block diagram of the address space for the various components as visible by each component on the controller board, according to at least one embodiment of the invention. In one embodiment, the address space may be defined as PCIe address space.

P0 810 represents the view of the PCIe address space from processor 0 (704) of FIG. 7. P1 830 represents a view of the PCIe address space visible from processor 1 (708) of FIG. 7. R0 850, R1 860, R2 870, and R3 880 represent the view of the PCIe address space from router 0 (712), router 1 (714), router 2 (716), and router 3 (718), respectively. In one embodiment, the PCIe root complex, such as processor 0 (704) may discover all the end points and configure the PCIe address space for each end point.

In some embodiments, access to any one of the various PCIe ranges visible from any one of the components of the controller board may result in a different type of response than an access to another PCIe address range. For example, according to one embodiment of the invention, accessing one range of the PCIe address space from the processor may result in configuration changes to one of the routers. In another example, accessing another range of PCIe address spaces may result in read/write accesses to one of the NVM blades coupled to one of the routers. Some accesses to the PCIe address space may also be mapped to local memory for the processor or memory for one of the adjacent processors on the controller board. In yet another example, some accesses to the PCIe address space may result in reads/writes to components on an adjacent controller board through a Non-Transparent (NT) PCIe bridge.

Through the PCIe address space, several entities have at least partial access to other entities' address space on the controller board. For example, in P0 810, processor P0 704 has access to its own memory, partial access to memory of processor P1 708 and each of the routers' address space. In one embodiment, the NVM blades are grouped into four separate groups of NVM blades, wherein each group of NVM blade may be coupled to one of the routers. Any one of the NVM blades belonging to a particular group of the NVM blades is accessible through the router the group of NVM blades may be coupled to.

In FIG. 8, from the PCIe address space for P0 810, B-G0 808 represents the address space for the first group of NVM blades accessible through router R0 712. The router R0 712 may be coupled to the first group of NVM blades and may also be configurable from processor P0 704 through the address space designated by the host bus adaptor 0 (HBA0) 806. Similarly, processor P0 (704) may access the second group of NVM blades through address space B-G1 814 and the second router R1 714 through HBA1 812, the third group of NVM blades through address space B-G2 818 and the third router R2 716 through HBA2 816, and the fourth group of NVM blades through address space B-G3 822 and the fourth router R3 718 through HBA3 820. In some implementations, sections of the address space 824 may be reserved. In certain embodiments, onboard NVM, such as MRAM 828 may be used for storing dynamic metadata, such as pointers, updated activity, cache backups and read/write buffers. Furthermore, processor P0 (704) may access its own local memory 706a-d through the PCIe address space DRAM(P0) 802 and the memory of the adjacent processor P1 708 through PCIe address DRAM(P1) 804. In some embodiments, processor P0 (704) may also send messages to components of an adjacent controller board through an NT port 826.

Similar to P0 810, the view of the PCIe address space from each of the components may provide the respective component the capability to interact with each other using the PCIe address space. For example, processor P1 (708), through its PCIe address space P1 830, can also access each of the routers (HBA0 840, HBA1 838, HBA2 836, and HBA3 833), the associated groups of NVM blades (B-G0 841, B-G1 839, B-G2 837 and B-G3 834), its own local memory 710a-d through PCIe address space for DRAM (P1)

831 and memory for the adjacent processor P0 (704) DRAM (P0) 832, MRAM 842, and the NT port 838.

The routers may also have a similar, but more restricted view of the PCIe address space. For example, router R0 712 may have a PCIe address space view R0 850 of the system. Router R0 may be able to communicate with processor P0 (704), processor P1 (708) through DRAM(P0) 851 and DRAM(P1) 853, respectively. In certain embodiments, onboard NVM, such as MRAM 854 may be used for storing dynamic metadata, such as pointers, updated activity, cache backups and read/write buffers. Accesses to the PCIe address space HBA0 858 by other components on the controller board may be interpreted as commands to router R0 712. Accesses to B-G0 856 may be interpreted as read and write requests to the NVM blades coupled to router R0 712. Router R0 712 may not have PCIe address space reserved for the other routers or NVM blades since there is no direct coupling between those components, as shown in FIG. 7. Router R3 718 also has access to the processor P0 (704) DRAM(P0) 881, processor P1 708 DRAM(P1) 883, MRAN 885, its own configuration space, and the NVM blades coupled to the router through HBA3 886 and B-G3 887, respectively.

Routers R1 714 and R2 716 also have access to processors P0 (704) and P1 (708) through DRAM(P0) (861, 871) and DRAM(P1) (863, 873), respectively. The configuration space for the routers R1 714 and R2 716 can be accessed through HBA1 866 and HBA2 877 and their associated NVM blades B-G1 867 and B-G2 878. In addition, routers R1 714 and R2 716 may be able to send messages to a router on an adjacent controller board through NT ports, 865 and 875, respectively.

In some implementations, some address ranges within the PCIe address space for each component may be unused and reserved for future use (843, 852, 857, 862, 864, 868, 872, 874, 876, 879, 882, 884 and 888).

As previously discussed, the PCIe address space configuration shown in FIG. 8 is for illustration purposes and is non-limiting to other implementations of the address space.

Figure 9:
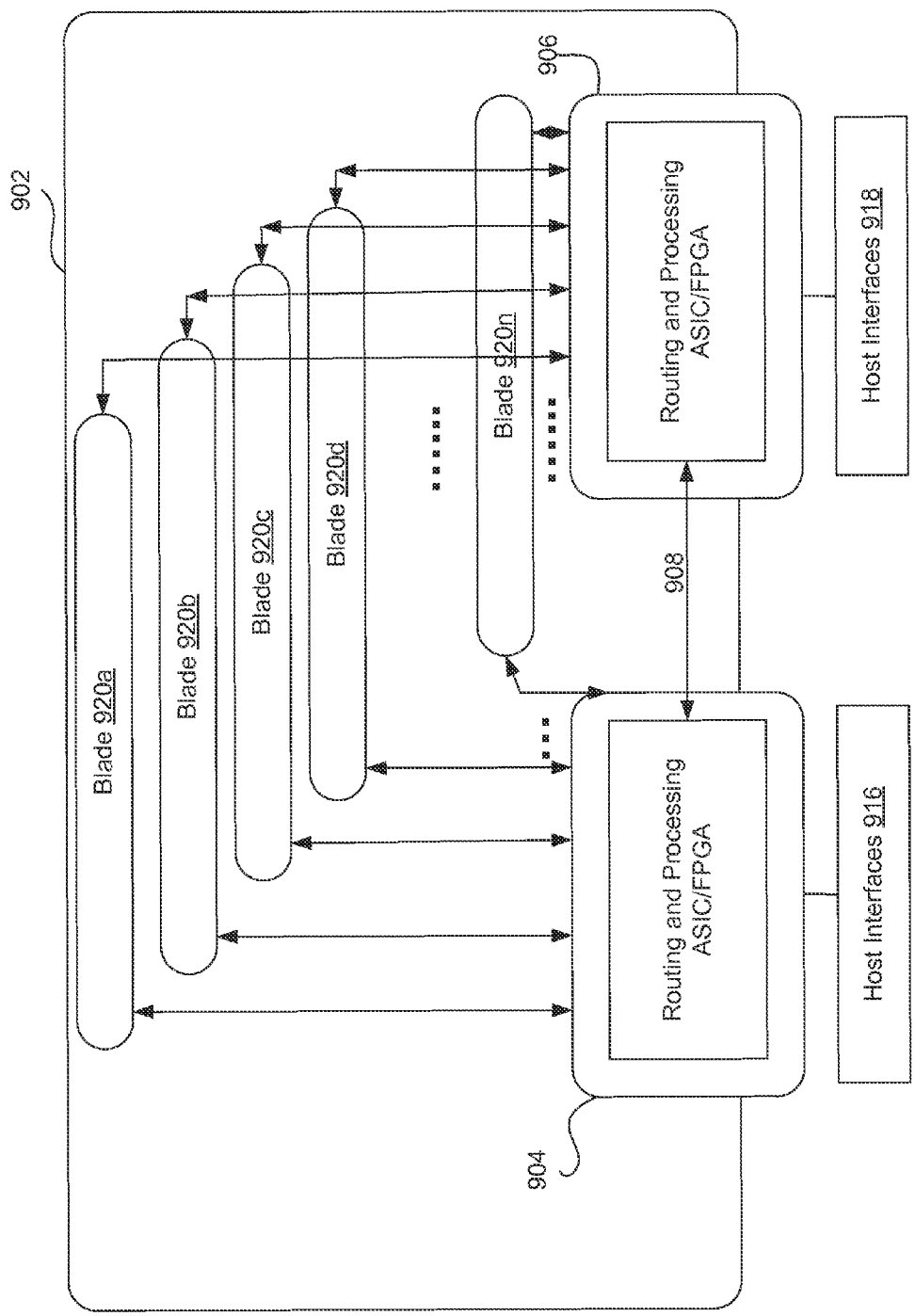
FIG. 9 illustrates another example high level block diagram of a storage device according to one embodiment of the invention.

FIG. 9 illustrates another example high level block diagram of the storage device according to one embodiment of the invention. Block 902 illustrates a storage device with two controllers (904 and 906) and an array of NVM blades (920a-n) coupled to the controllers. In one embodiment, controllers 904 and 906 may be coupled together, using a communication protocol to communicate status information between the controllers 904 and 906 for the read and write transactions using a bridge 908.

In one implementation, the first controller 904 and the second controller 906 are printed circuit boards (PCBs) comprising one or more processors for processing I/O requests, one or more routers for routing operations between the controllers and the plurality of NVM blades and one or more interfacing chips. Examples of such controller boards have been previously discussed in FIGS. 1-8. In another implementation, functionality of multiple discrete components may be performed by a controller implemented as an ASIC, FGPA, MCM or any other suitable solution. In one implementation, the first controller 904 and the second controller 906 may be implemented as ASICs, each comprising processing logic and routing logic. In one implementation, the controllers may also include interfacing logic. In another implementation, as shown in FIG. 9, the first controller 904 may be coupled to a host interface 916 and the second controller 906 may be coupled to another host interface 918 for receiving and responding to I/O requests.

In certain embodiments, the storage device from FIG. 9 may represent an active/active storage device. An active/active configuration enables the processing logic for the controllers to process I/Os and provide standby capability for the other. It may be advantageous to implement an active/active storage device to boost performance, since the processing logic associated with both controllers may process I/O simultaneously or near simultaneously. However, the storage device from FIG. 9 is not limited to an active/active storage device and may also be used in an active/passive configuration, where the processing logic for one controller is active to process I/O requests, while the other is idle in standby mode ready to take over I/O activity should the active primary controller board fail or be taken offline.

In one implementation, in an active/active system shown in FIG. 9, the first controller 904 may be configured to operate in an active mode and receive I/O requests for storing and retrieving data from NVM storage medium. Similarly, the second controller 906 may also be configured to operate in active mode and receive I/O requests for storing and retrieving data from the NVM storage medium. Although FIG. 9 depicts only two controllers, multiple controllers may operate in active mode.

Additionally, the storage device may include a plurality of NVM blades 920a-n comprising a NVM storage medium. In one implementation, each NVM blade may be coupled to both the controllers (904 and 906), allowing each physical address of the NVM storage medium to be accessible by either of the controllers. This configuration may be advantageous in avoiding duplication of the underlying storage medium and mirroring of the data, wherein the reliability of the data on the physical medium may be assured by using a more reliable storage medium and/or sophisticated data recovery techniques, such as RAID, or any combination thereof. Each NVM blade may include a first routing interface to communicate with the first controller 904 and a second routing interface to communicate with the second controller 906. In one implementation, the first routing interface communicates with the first controller and the second routing interface communicates with the second controller using the PCIe protocol or any other suitable protocol.

In one implementation of an active/active system, one or more controllers may assume the role as the master controller and the other one or more controllers may assume the role of slave controllers. In one implementation, the master controller may perform or initiate all data writes to the NVM blades, whereas either of the master or slave boards may perform reads.

Generally, a storage device may service many more read operations than store or write operations to the storage medium. Also, generally read operations may complete faster than store or write operations. Consequently, the rate at which read operations may be serviced may be constrained by the rate at which I/O requests may be decoded and processed by the processing logic of the controllers. Therefore, it may be advantageous to load balance the I/O read operations between the two or more controllers in an active/active system for processing and decoding of the I/O read operations. Therefore, both the master and the slave controllers may process I/O read operations. Accordingly, in FIG. 9, both the first controller 904 and the second controller 906 may be configured to decode I/O requests simultaneously or near simultaneously for read operations and request data from the NVM storage medium.

In one example implementation, write operations arriving at the slave controller board may be partially performed by the master controller. For example, the write command or the information associated with the write command may be forwarded from the slave controller to the master controller. In one implementation, the bridge 908 (e.g., PCIe NT bridge) may be used for passing the information associated with the write operation from the slave controller to the master controller. In one implementation, the data for the write operation arriving at the slave controller may still be provided to the NVM blade by the slave controller.

For illustration purposes, at a given point in time, the first controller 904 may be the master controller and the second controller 906 may be the slave controller. In one example, an I/O request may arrive at the first controller 904 that may be operating as the master controller. The first controller 904 may determine that an I/O request is a write operation for storing data associated with the I/O request to the NVM storage medium. The master controller may process the I/O request, determine the NVM blade to dispatch the write command to and transmit the command and the data to the NVM blade for storing the data.

In another example, an I/O request may arrive at the second controller 906 that may be operating as a slave controller. The second controller 906 may determine that an I/O request is a write operation for storing data associated with the I/O request to the NVM storage medium. The second controller 906 may transmit the command information associated with the second I/O request to the first controller 904 that may be acting as the master controller. The master/first controller 904 may receive the transmitted command information from the second controller 906, determine the NVM blade that the data may be stored to and transmit the write command to the NVM blade. Even though the write command may be transmitted by the master controller, the second controller 906, acting as the slave controller, may transmit the data associated with the I/O request to the NVM blades. Administering all write operations from the master may help maintain write coherency in the system. On the other hand, forwarding the data from the slave controller to the NVM blade for the I/O write request that was received at the slave controller avoids requiring significant increase in the bandwidth of the bridge 908 (e.g., NT PCIe bridge) between the first controller 904 and the second controller 906 for forwarding data between the two.

The master and the slave controllers may maintain mapping tables for mapping the read and write operations to the NVM blades. In one implementation, the read and write tables are stored in one of the NVM blades. In one implementation, the read and write tables may be shared by the two controllers. Yet, in another implementation, the read and write tables may be maintained separately by the controllers. In instances where each controller has its own table, the master controller may update the tables for both the master and slave controllers.

If the slave controller fails, the master controller continues to process operations as before. On the other hand, if the master controller fails, the storage device fails over to the slave controller. In other words, the slave controller may become the new master controller and start processing the write operations. For example, if the first controller 904 acting as the master controller encounters unrecoverable errors, the system may fail over and the second controller 906 may become the master controller.

Figure 10:
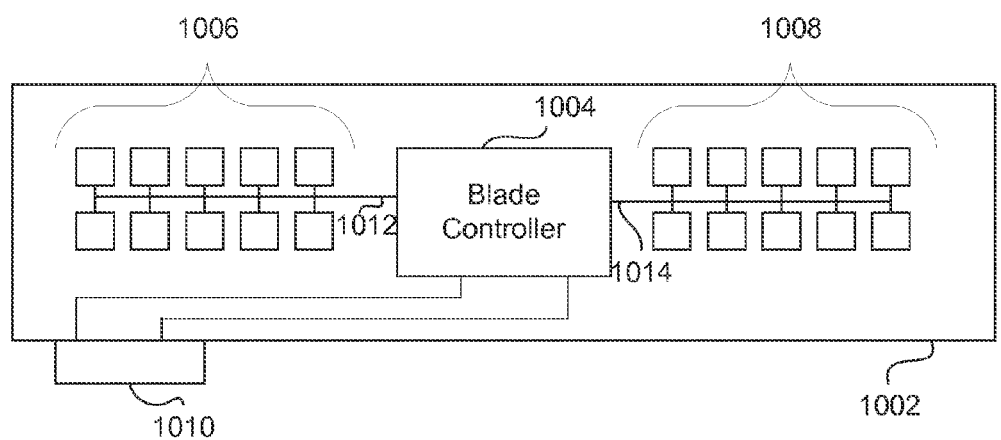
FIG. 10 illustrates an example block diagram of a NVM blade according to one embodiment of the invention.

In some implementations, the storage device may also include multiple power supplies. Power supplies are generally failure prone and may fail due to failure of the fans or other power components. Having multiple power supplies powering the storage device may avoid failure of the storage device due to a failure in a component of one of the power supplies. In one implementation, the controller boards may be powered through a power rail, wherein the power rail may source power from the multiple power supplies. In the event of a failure of one of the power supplies connected to the power rail, the power rail continues to source power from the functioning power supply. In some implementations, the failed power supply may be hot-swappable (i.e., replaceable without power cycling the storage device) with a properly functioning power supply. FIG. 10 illustrates an example block diagram of a NVM blade according to one embodiment of the invention. In some embodiments, the NVM blade 1002 may represent one implementation of the NVM blade 420 of FIG. 4 or one of the NVM blades 920*a-n* from FIG. 9. The example NVM blade 1002 may include one or more NVM chips (1006 and 1008) and a blade controller 1004. The NVM chips may comprise NVM storage medium. The NVM chips may be coupled to the blade controller 1004 through a shared bus (912 and 1014) or dedicated bus (not shown). The blade controller 1004 may be responsible for receiving commands for accessing/storing data on the NVM chips, processing the commands, storing or retrieving the data from the NVM chips and other configuration commands. Although not shown, NVM chips may also reside on the opposite side of the NVM blade. In one embodiment, the blade controller 1004 may be implemented using an application-specific integrated circuit (ASIC). In another embodiment, the NVM blade controller may be implemented using a field-programmable gate array (FPGA).

Figure 11:
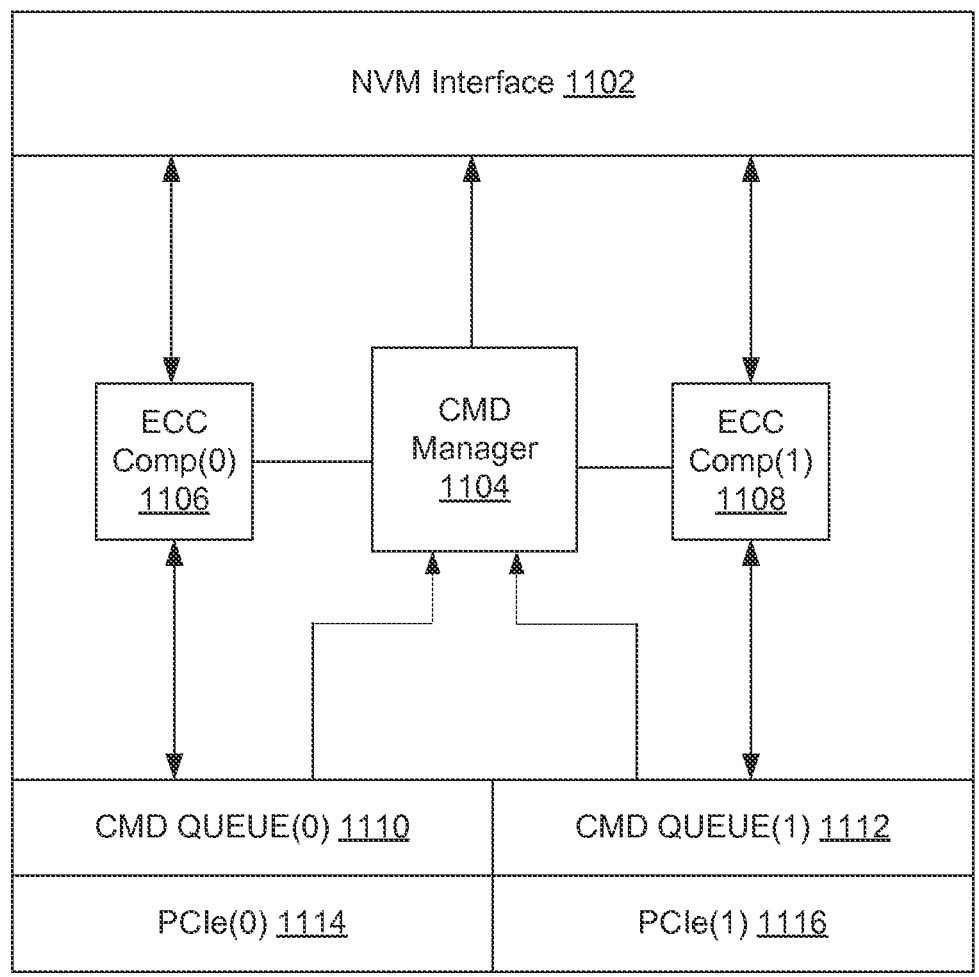
FIG. 11 illustrates an example block diagram of a blade controller according to one embodiment of the invention.

FIG. 11 illustrates an example block diagram of a blade controller according to one embodiment of the invention. In one implementation, the blade controller 1004 may have two or more PCIe interfaces (1014 and 1116) for connecting to the routing entities on the controller (or controller boards). For example, the PCIe interface 1114 may be coupled to one of the PCIe interfaces on the routing entities from the first controller and the PCIe interface 1116 may be coupled to one of the PCIe interfaces on the routing entities from the second controller. Each PCIe interface may maintain a command queue (1010 and 1112) associated with commands arriving from the respective controller that the PCIe interface is coupled to. In one embodiment, the data paths for the data associated with the controllers may be maintained separately. For example, the data associated with each controller may be compressed at blocks 1106 and 1108 accordingly, before storing of the data to the NVM storage medium and decompressed after retrieving the data from the NVM storage medium. Maintaining separate data paths may allow for higher throughput of data and reduce errors associated with the data path. In one embodiment, error detection and/or correction may be performed, at blocks 1106 and 1108, using error correction codes (ECC). For example, the data may be coded and compressed before storing the data in the NVM storage medium and decompressed and checked for errors at the time of retrieving data. If errors are detected, in some scenarios, the data may be recoverable. If the error is not-recoverable, the NVM blade may discard the read request or respond with an error condition to the controller board.

The command manager 1104 arbitrates the commands at the multiple PCIe interfaces. The command manager 1104 decodes the commands, and accesses the appropriate NVM storage medium from the array of chips for the storing/accessing of the data. By arbitrating the commands, in some embodiments, the command manager 1104 may allow only one active command to access/store data through the NVM interface 1102 at any particular period in time. In some implementations, the PCIe interface, command queues and the ECC compression/decompression logic may be implemented separately for interfacing with each controller board. Such isolation between the read/write paths, queues and logic may be advantageous in avoiding failures on one interface of the NVM blade adversely affecting the second interface of the NVM blade. For example, if the command queue 1110 starts backing up due to an error anywhere from the first controller board to the NVM interface 1102, the read/write data path from the second controller board to the NVM storage medium may continue to function normally. Therefore, in instances where a store operation to the NVM storage medium fails from one first controller board, upon detection of such an error, the store operation to the same memory location on the non-volatile memory may be completed using the second controller board.

Figure 12:
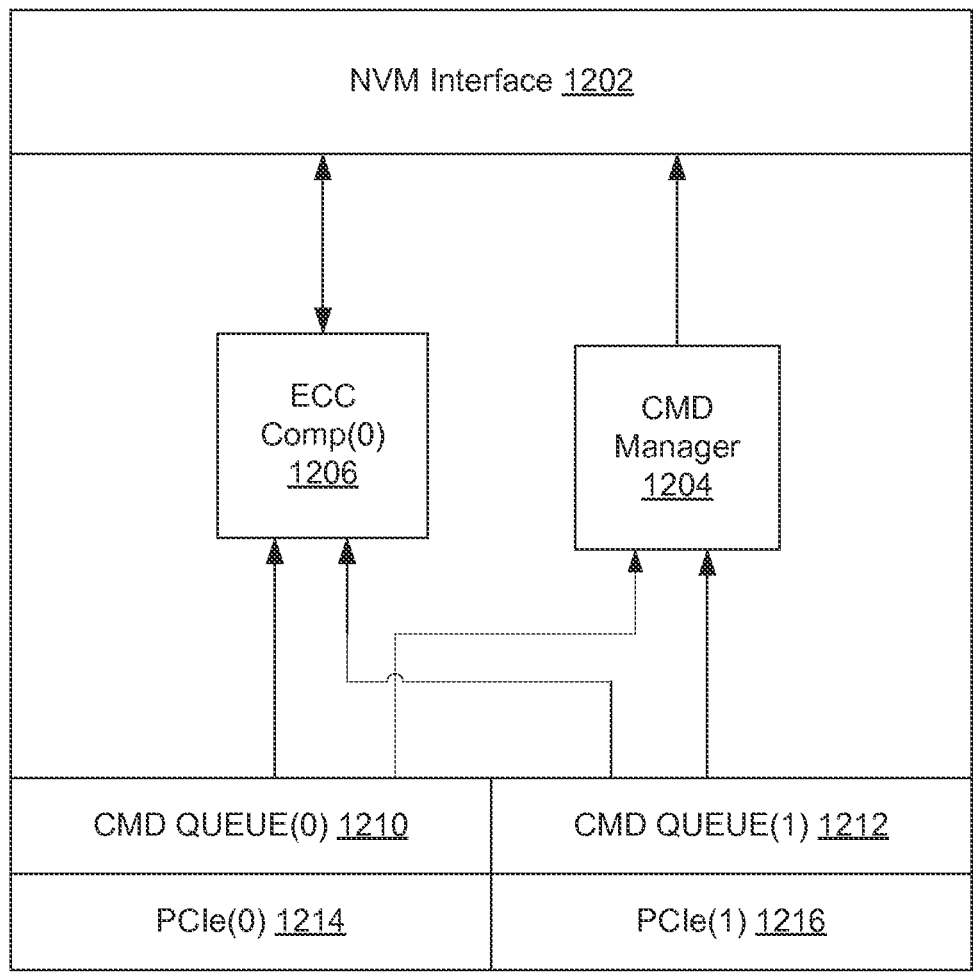
FIG. 12 illustrates another example block diagram of a blade controller according to one embodiment of the invention.

FIG. 12 illustrates another example block diagram of a blade controller according to one embodiment of the invention. This alternate embodiment of the blade controller 1004 may also have two or more PCIe interfaces (1214 and 1216) for connecting to the routing logic on the controllers and command queues (1210 and 1212) associated with commands arriving from the respective controllers that the PCIe interface is coupled to. In one implementation, the command queues may be implemented using buffers. In one implementation, the command queue may be configured to discard commands from the first controller once the command queue buffer is full beyond a pre-determined threshold.

In one embodiment, a unified data path and a unified command path may be implemented as shown in FIG. 12. In some embodiments, the data from the data path may be compressed at block 1206 before the data is stored to the NVM storage medium and decompressed after retrieving from the NVM storage medium. In one embodiment, error detection and/or correction may be performed, at blocks 1206, using error correction codes (ECC). For example, the data may be coded and compressed before the data in the NVM storage medium is stored and decompressed and checked for errors at the time of retrieving data. If errors are detected, in some scenarios, the data may be recoverable. If the error is not-recoverable, the NVM blade may discard the read request or respond with an error condition to the controller.

The command manager 1204 may arbitrate the commands from the multiple PCIe interfaces. The command manager 1204 decodes the commands, and accesses the appropriate NVM storage medium from the array of chips for the storing/accessing of the data. By arbitrating the commands, the command manager 1204 may allow only one active command to access/store data through the NVM interface 1202 at any particular period in time. As shown in FIG. 12, a unified data and command path may result in cost and design efficiencies.

Although not shown in the figures above, in one implementation, a separate command and/or data queue may be maintained for each NVM chip from the plurality of NVM chips comprising the NVM storage medium for the NVM blade. Furthermore, a separate set of command and/or data queues may be maintained for each controller. For example, in an implementation of a NVM blade with 32 NVM chips, 32 command and/or data queues may be maintained for the requests originating from the first controller and 32 command and/or data queues may be maintained for requests originating from the second controller. Such a configuration may allow multiple outstanding commands to initiate, process and/or complete while other commands are initiated, processed and completed on the NVM blades, as long as the operations are not targeted to the same NVM chip. The command manager 1004 may arbitrate the commands originating from the two controllers.

Figure 13:
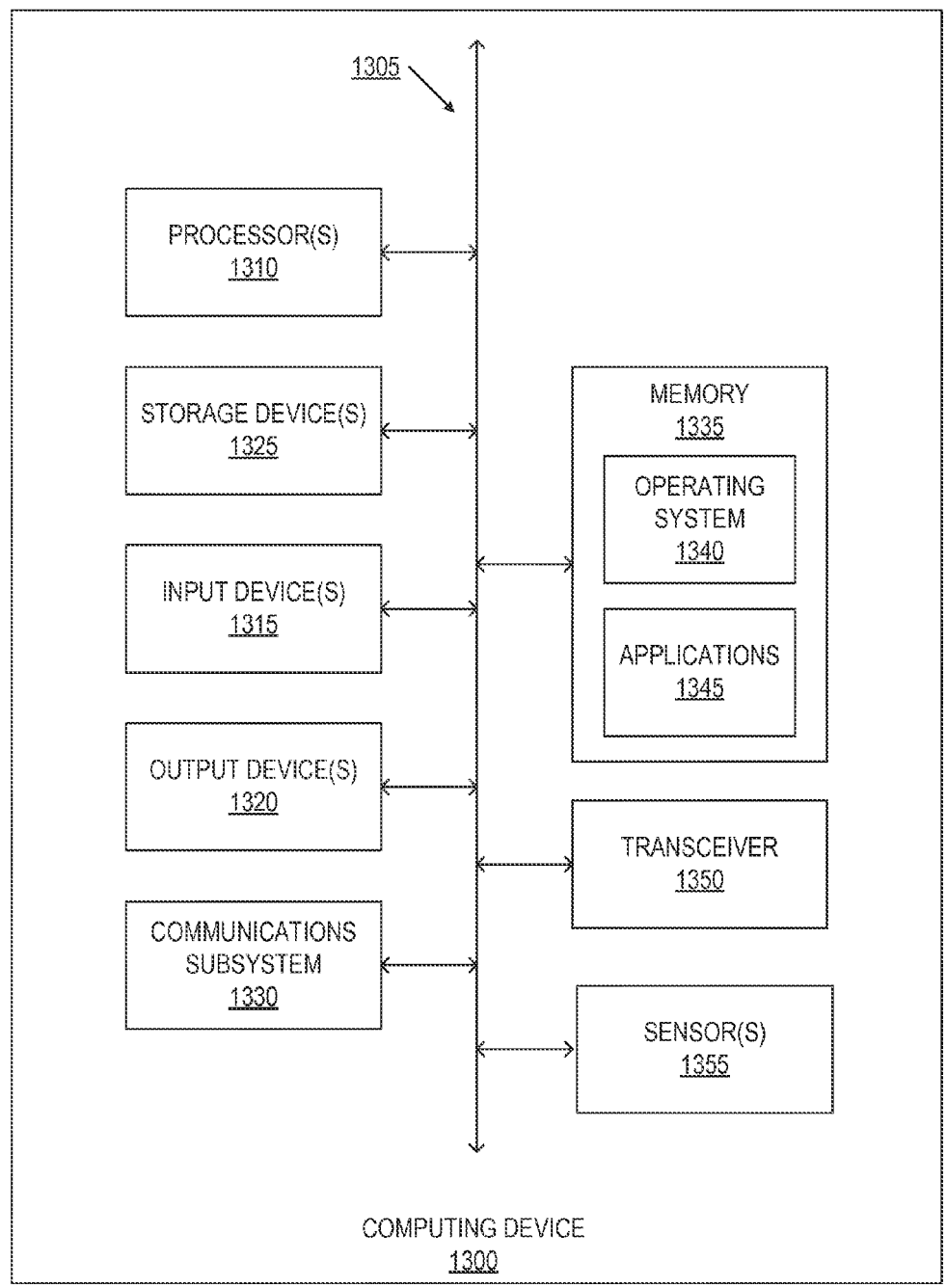
FIG. 13 depicts a computer system for performing embodiments of the invention.

Having described multiple aspects of the vertically integrated architecture, an example of a computing system in which various aspects of the disclosure may be implemented may now be described with respect to FIG. 13. According to one or more aspects, a computer system as illustrated in FIG. 13 may be incorporated as part of a computing device, which may implement, perform, and/or execute any and/or all of the features, methods, and/or method steps described herein. For example, computer system 1300 may represent some of the components of a device and/or access point apparatus. A device may be any computing device with a wireless unit, such as an RF receiver. In one embodiment, the system 1300 is configured to implement any of the methods described herein. FIG. 13 provides a schematic illustration of one embodiment of a computer system 1300 that can perform the methods provided by various other embodiments, as described herein, and/or can function as the host computer system, a remote kiosk/terminal, a point-of-sale device, a mobile device, a set-top box, and/or a computer system. FIG. 13 is meant only to provide a generalized illustration of various components, any and/or all of which may be utilized as appropriate. FIG. 13, therefore, broadly illustrates how individual system elements may be implemented in a relatively separated or relatively more integrated manner.

The computer system 1300 is shown comprising hardware elements that can be electrically coupled via a bus 1305 (or may otherwise be in communication, as appropriate). The hardware elements may include one or more processors 1310, including without limitation one or more general-purpose processors and/or one or more special-purpose processors (such as digital signal processing chips, graphics acceleration processors, and/or the like); one or more input devices 1315, which can include without limitation a camera, a mouse, a keyboard and/or the like; and one or more output devices 1320, which can include without limitation a display unit, a printer and/or the like. The computing device 1300 may also include a sensor(s), such as temperature sensors, power sensors, etc. for monitoring health of the system.

The computer system 1300 may further include (and/or be in communication with) one or more non-transitory storage devices 1325, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, NVM-updateable and/or the like. Such storage devices may be configured to implement any appropriate data storage, including without limitation, various file systems, database structures, and/or the like.

The computer system 1300 might also include a communications subsystem 1330, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 1330 may permit data to be exchanged with a network (such as the network described below, to name one example), other computer systems, and/or any other devices described herein. In many embodiments, the computer system 1300 may further comprise a non-transitory working memory 1335, which can include a RAM or ROM device, as described above. The computer system 1300 might also include a transceiver 1350 for facilitating communication by the communications subsystem 1330 with the external entities.

The computer system 1300 also can comprise software elements, shown as being currently located within the working memory 1335, including an operating system 1340, device drivers, executable libraries, and/or other code, such as one or more application programs 1345, which may comprise computer programs provided by various embodiments, and/or may be designed to implement methods, and/or configure systems, provided by other embodiments, as described herein. Merely by way of example, one or more procedures described with respect to the method(s) discussed above, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1325 described above. In some cases, the storage medium might be incorporated within a computer system, such as computer system 1300. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1300 and/or might take the form of source and/or installable code, which, upon compilation and/or installation on the computer system 1300 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 1300) to perform methods in accordance with the disclosure. For example, some or all of the procedures of the described methods may be performed by the computer system 1300 in response to processor 1310 executing one or more sequences of one or more instructions (which might be incorporated into the operating system 1340 and/or other code, such as an application program 1345) contained in the working memory 1335. Such instructions may be read into the working memory 1335 from another computer-readable medium, such as one or more of the storage device(s) 1325. Merely by way of example, execution of the sequences of instructions contained in the working memory 1335 might cause the processor(s) 1310 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1300, various computer-readable media might be involved in providing instructions/ code to processor(s) 1310 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1325. Volatile media include, without limitation, dynamic memory, such as the working memory 1335. Transmission media include, without limitation, coaxial cables, copper wire and fiber optics, including the wires that comprise the bus 1305, as well as the various components of the communications subsystem 1330 (and/or the media by which the communications subsystem 1330 provides communication with other devices). Hence, transmission media can also take the form of waves (including without limitation radio, acoustic and/or light waves, such as those generated during radio-wave and infrared data communications).

Some embodiments may employ a computer system (such as the processor 1310) to perform methods in accordance with the disclosure. For example, some or all of the procedures of the described methods may be performed by the viewing apparatus in response to the processor executing one or more sequences of one or more instructions (which might be incorporated into an operating system and/or other code, such as an application program) contained in working memory. Such instructions may be read into the working memory from another computer-readable medium, such as one or more of the storage device(s). Merely by way of example, execution of the sequences of instructions contained in the working memory might cause the processor(s) to perform one or more procedures of the methods described herein.

Again, embodiments employing computer systems described herein are not limited to being physically connected to the viewing apparatus. Processing may occur in another apparatus, connected via wire or wirelessly to the viewing apparatus. For example, a processor in a phone or instructions for executing commands by a phone or tablet may be included in these descriptions. Similarly, a network in a remote location may house a processor and send data to the viewing apparatus.

The terms "machine-readable medium" and "computer-readable medium," as used herein, refer to any medium that participates in providing data that causes a machine to operate in a specific fashion. In an embodiment implemented using the processor 1310, various computer-readable media might be involved in providing instructions/code to processor(s) 1310 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks. Volatile media include, without limitation, dynamic memory, such as NVM memory or DDR3 RAM. Transmission media include, without limitation, coaxial cables, copper wire and fiber optics, as well as the various components of a communications subsystem (and/or the media by which the communications subsystem provides communication with other devices). Hence, transmission media can also take the form of waves (including without limitation radio, acoustic and/or light waves, such as those generated during radio-wave and infrared data communications).

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. "Data storage media" as used herein refers to manufactures and does not refer to transitory propagating signals. By way of example, and not limitation, such computer-readable media can comprise RAM, ROM, EEPROM, CD-ROM or other optical disk storage, magnetic disk storage, or other magnetic storage devices, NVM memory, or any other medium that can be used to store desired program code in the form of instructions or data structures and that can be accessed by a computer. Disk, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application-specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware stored on computer-readable media.

Various examples have been described. These and other examples are within the scope of the following claims.

The invention claimed is:

1. A storage device comprising:
a plurality of non-volatile memory (NVM) blades, each NVM blade comprising non-volatile memory;
a first processor coupled to the plurality of NVM blades, wherein the first processor is configured to:
receive a first input/output (I/O) request;
determine if the first I/O request is a first read request or a first write request;
in response to determining that the first I/O request is a first read request,
determine a location in a first target NVM blade from which first data is to be read;
request and receive the first data associated with the first I/O request from the first target NVM blade; and
in response to determining that the first I/O request is a first write request;
determine the location in the first target NVM blade at which second data is to be stored;
transmit second data to the first target NVM blade for storing the second data in the first target NVM blade; and
a second processor coupled to the plurality of NVM blades, wherein the second processor is configured to:
receive a second I/O request;
determine if the second I/O request is a second read request or a second write request;
in response to determining that the second I/O request is a second read request,
determine a location in a second target NVM blade from which third data is to be read; and
request and receive the third data associated with the second I/O request from the second target NVM blade; and
in response to determining that the second I/O request is a second write request;
determine the location in the second target NVM blade at which fourth data is to be stored; and
transmit fourth data to the second target NVM blade for storing the fourth data in the second target NVM blade.

2. The storage device of claim 1, wherein the plurality of NVM blades are coupled to the first processor and the second processor using at least one router.

3. The storage device of claim 1, wherein the first target NVM blade and the second target NVM blade are a same target NVM blade.

4. The storage device of claim 3, wherein the first processor accesses a first location on the same target NVM blade for servicing the first I/O request and the second processor accesses the first location on the same target NVM blade for servicing the second I/O request.

5. The storage device of claim 1, wherein the first processor, the second processor and a router are mounted on a controller board, and wherein data between the first processor, the second processor, and the plurality of NVM blades is routed through the router.

6. The storage device of claim 1, wherein the first processor is at least one of a first Application Specific Integrated Circuit (ASIC) and a first Field Programmable Gate Array (FPGA) and the second processor is at least one of a second ASIC and a second FPGA.

7. The storage device of claim 1, further comprising:
a first controller board, wherein the first processor and a first router are mounted on the first controller board and wherein the first processor is coupled to the plurality of NVM blades via the first router; and
a second controller board, wherein the second processor and a second router are mounted on the second controller board and wherein the second processor is coupled to the plurality of NVM blades using the second router.

8. The storage device of claim 1, wherein the transmitting of data between the first processor and the first target NVM blade and the transmitting of data between the second processor and the second target NVM blade is performed using Peripheral Component Interconnect Express (PCIe) protocol.

9. The storage device of claim 1, wherein the first I/O request received by the first processor is first received at one or more interface chips and forwarded to the first processor through a router of a plurality of routers.

10. The storage device of claim 1, wherein at least one of the NVM blades comprises a NAND flash memory.

11. A method for storing data, comprising:
- receiving, by a first processor, a first input/output (I/O) request, wherein the first processor is coupled to a plurality of non-volatile memory (NVM) blades, each NVM blade comprising non-volatile memory (NVM);
- determining, by the first processor, if the I/O request is a first read or a first write request;
- in response to determining that the first I/O request is a first read request,
    - determining, by the first processor, a location in a first target NVM blade from which first data is to be read, and
    - requesting and receiving, by the first processor, the first data associated with the first I/O request from the first target NVM blade; and
- in response to determining that the first I/O request is a first write request,
    - determining, by the first processor, the location in the first target NVM blade at which second data is to be stored, and
    - transmitting, by the first processor, second data to the first target NVM blade for storing the second data in the first target NVM blade; and
- receiving, by a second processor, a second input/output (I/O) request, wherein the second processor is coupled to the plurality of NVM blades;
- determining, by the second processor, if the second I/O request is a second read or a second write request;
- in response to determining that the second I/O request is a second read request,
    - determining, by the second processor, a location in a second target NVM blade from which third data is to be read;
    - requesting and receive, by the second processor, the third data associated with the second I/O request from the second target NVM blade; and
- in response to determining that the second I/O request is a second write request;
    - determining, by the second processor, the location in the second target NVM blade at which fourth data is to be stored; and
    - transmitting, by the second processor, fourth data to the second target NVM blade for storing the fourth data in the second target NVM blade.

12. The method of claim 11, wherein the plurality of NVM blades are coupled to the first processor and the second processor using one or more routers.

13. The method of claim 11, wherein the first target NVM blade and the second target NVM blade are a same target NVM blade.

14. The method of claim 13, wherein the first processor accesses a first location on the same target NVM blade for servicing the first I/O request and the second processor accesses the first location on the same target NVM blade for servicing the second I/O request.

15. The method of claim 11, wherein the first processor, the second processor and a router are mounted on a controller board, and wherein data between the first processor, the second processor, and the plurality of NVM blades is routed through the router.

16. The method of claim 15, wherein the first processor is at least one of a first Application Specific Integrated Circuit (ASIC) and a first Field Programmable Gate Array (FPGA) and the second processor is at least one of a second ASIC and a second FPGA.

17. The method of claim 11, wherein the first processor and a first router are mounted on a first controller board and wherein the first processor is coupled to the plurality of NVM blades via the first router; and
wherein the second processor and a second router are mounted on a second controller board and wherein the second processor is coupled to the plurality of NVM blades using the second router.

18. The method of claim 11, wherein the transmitting of data between the first processor and the first target NVM blade and the transmitting of data between the second processor and the second target NVM blade is performed using Peripheral Component Interconnect Express (PCIe) protocol.

19. The method of claim 11, wherein the first I/O request received by the first processor is first received at one or more interface chips and forwarded to the first processor through a router of a plurality of routers.

20. The method of claim 11, wherein at least one of the NVM blades includes a NAND flash memory.

* * * * *